United States Patent [19]

Wolcott

[11] E Re. 29,991

[45] Reissued May 8, 1979

[54] ADAPTABLE TIME DIVISION SWITCH

[75] Inventor: John R. Wolcott, Orlando, Fla.

[73] Assignee: Martin Marietta Corporation, Orlando, Fla.

[21] Appl. No.: 853,069

[22] Filed: Nov. 21, 1977

Related U.S. Patent Documents

Reissue of:

[64] Patent No.: 3,971,891
Issued: Jul. 27, 1976
Appl. No.: 558,605
Filed: Mar. 14, 1975

[51] Int. Cl.[2] ..... H03K 13/22; H04J 3/00; H04L 3/00; G06F 5/00

[52] U.S. Cl. ..... 179/15 AP; 340/347 DD

[58] Field of Search ..... 325/38 R, 38 A, 38 B; 179/18 FC, 15 AQ, 15 AP, 15 AT, 15 BS, 18 F, 18 FA; 340/347 DD

*Primary Examiner*—Thomas A. Robinson
*Attorney, Agent, or Firm*—Julian C. Renfro; Gay Chin

[57] ABSTRACT

A switching network is disclosed that is capable of handling analog, PCM and CVSD signals connected to said network via loops or trunks. All signals are converted into CVSD format, synchronized to the network clocks, and switching is carried out on a time divided basis by shifting bits from one channel slot in the frame format on the input side of the switching circuit to a different channel slot in the frame format on the output side of the switching circuit. The multiplexing and demultiplexing of data on the input and output sides of the channel shifting mechanism is controlled by words in a random access memory. Thus, the mux-demux operation is easily varied by changing the word storage in the random access memory. The channel shifting is controlled by the words stored in a second random access memory. Thus, channel shifting is also easily varied.

An all digital CVSD/PCM converter is provided and is time shared to participate in the functions of analog/CVSD conversion, PCM/CVSD conversion and conference calling. The all digital CVSD/PCM converter is implemented by selecting binary equivalents for the time constants and exponential values which appear in an analog to CVSD converter.

36 Claims, 13 Drawing Figures

SOME KEY ELEMENTS OF THE ADAPTABLE TIME DIVISION SWITCH

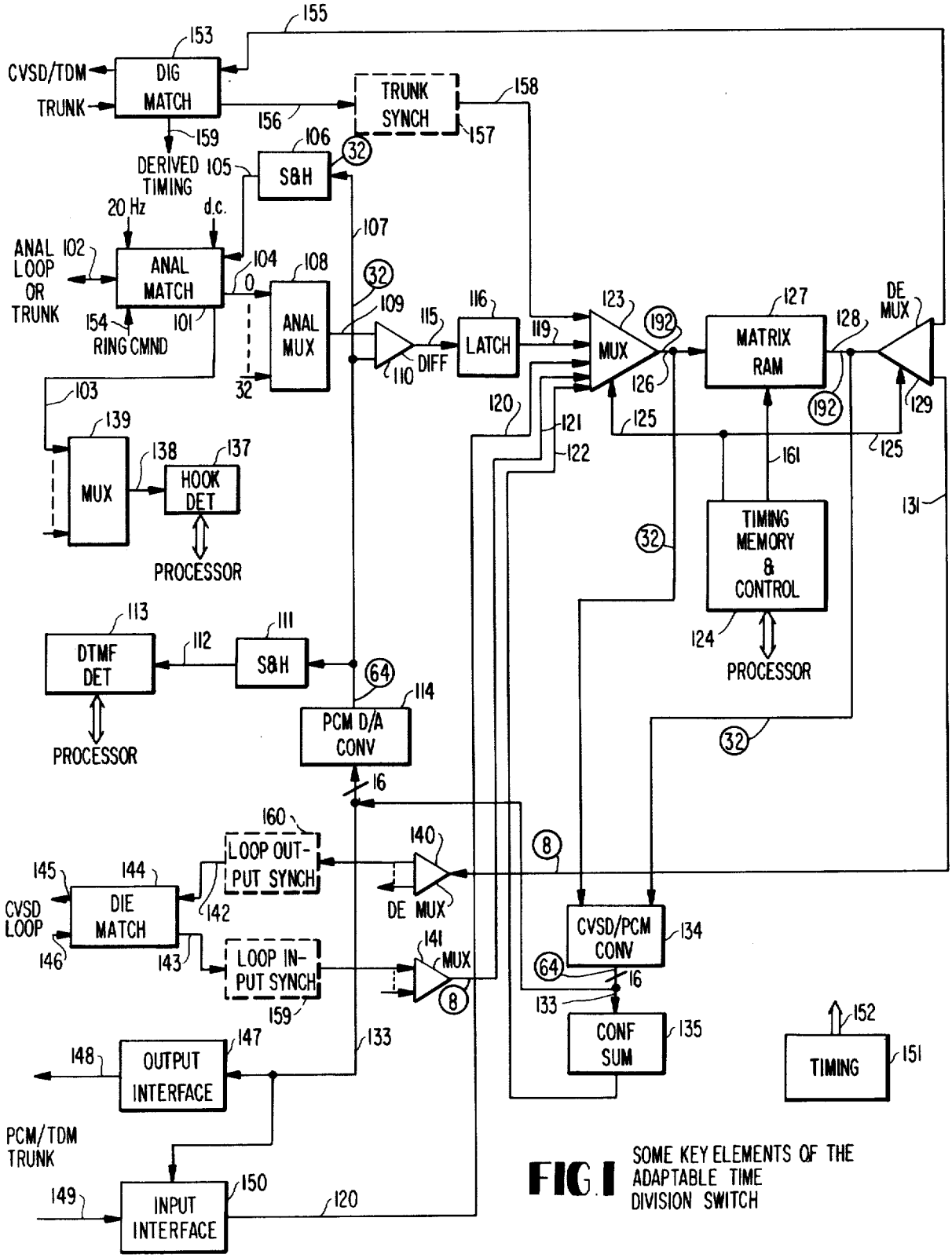
FIG. 1 SOME KEY ELEMENTS OF THE ADAPTABLE TIME DIVISION SWITCH

FIG. 2 THE 192 CHANNEL TDMX
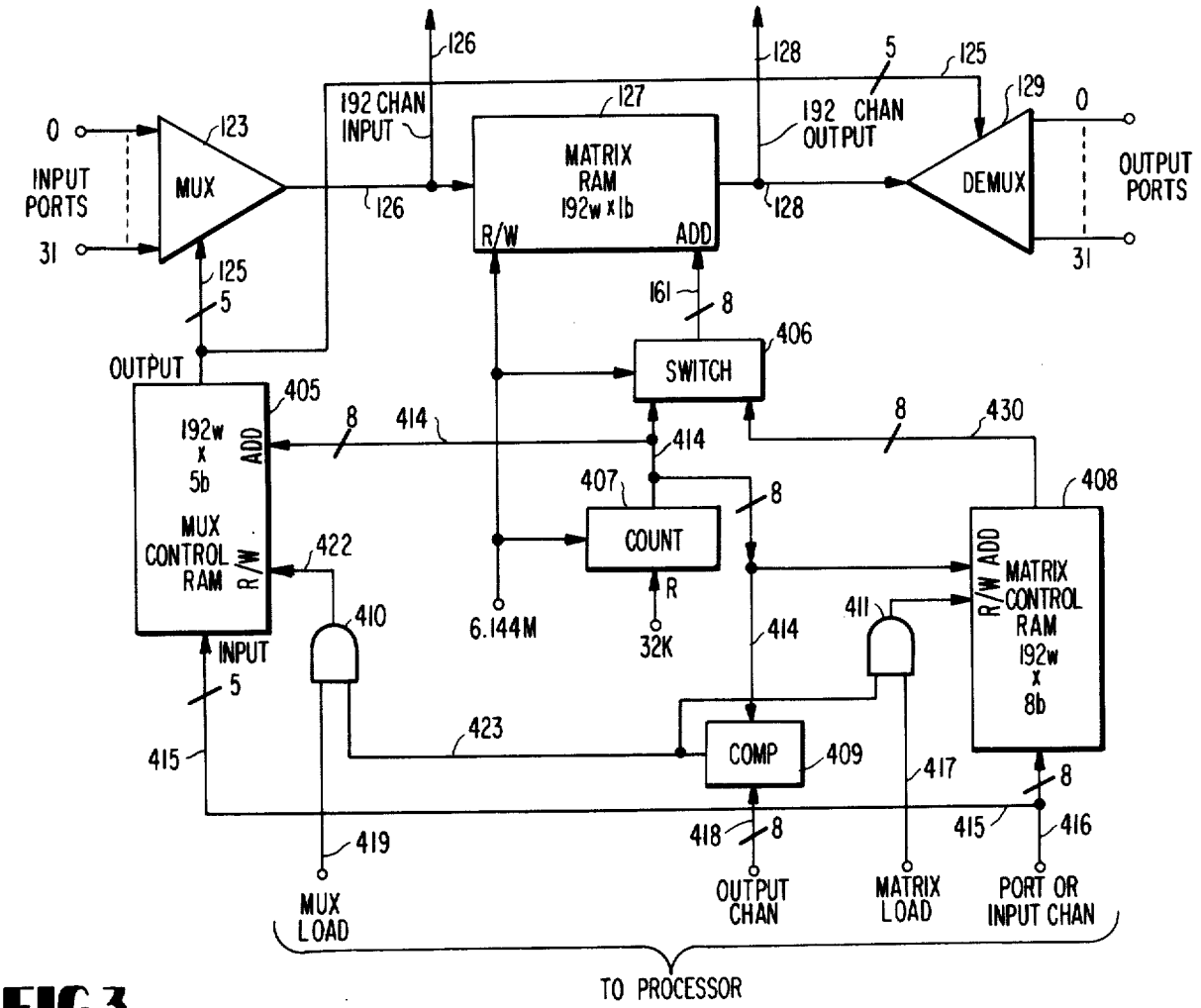
FIG. 3
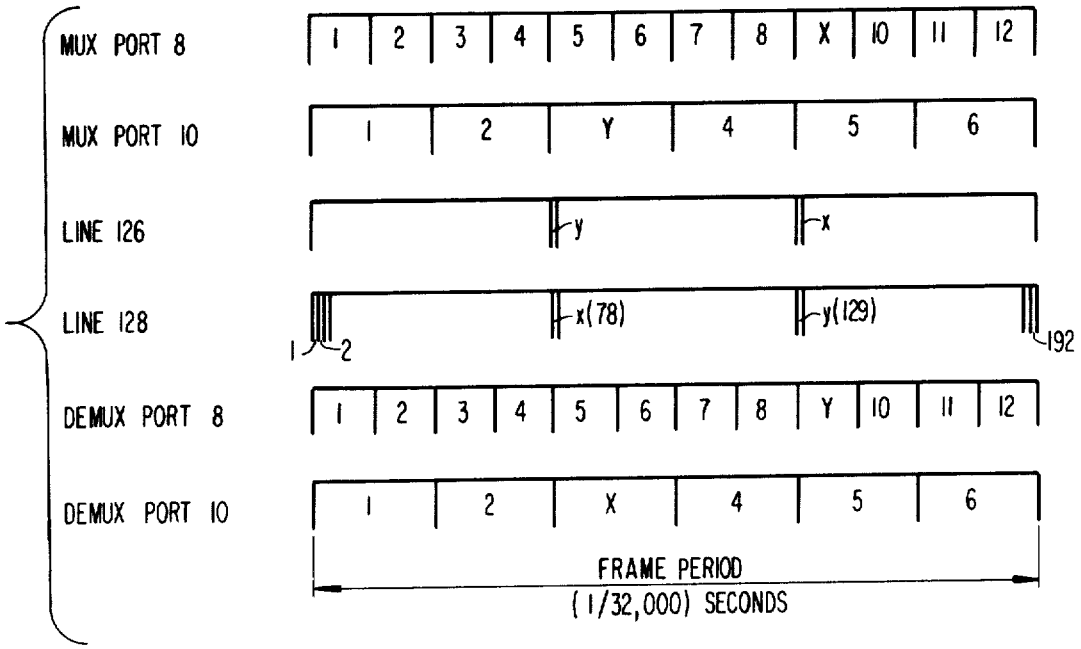

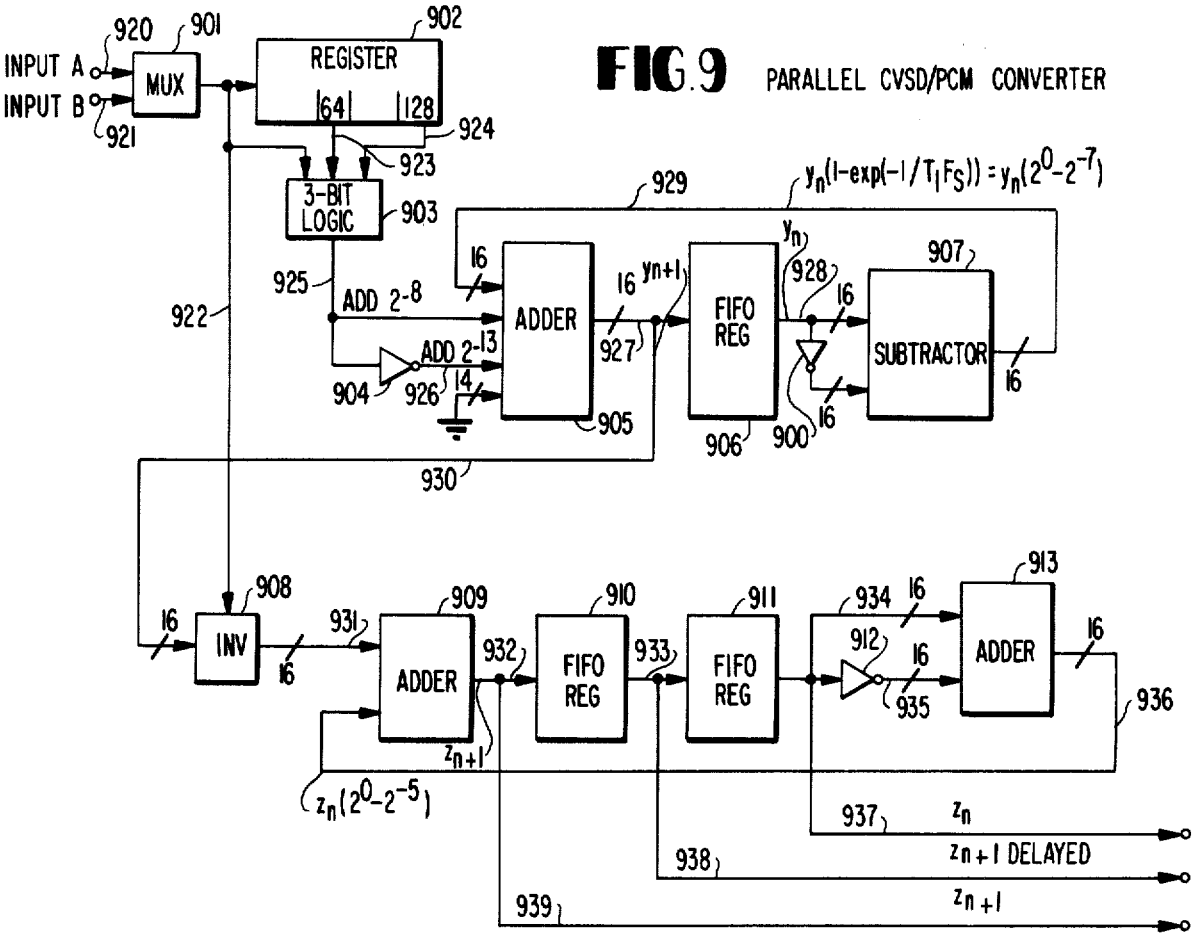
FIG. 9 PARALLEL CVSD/PCM CONVERTER
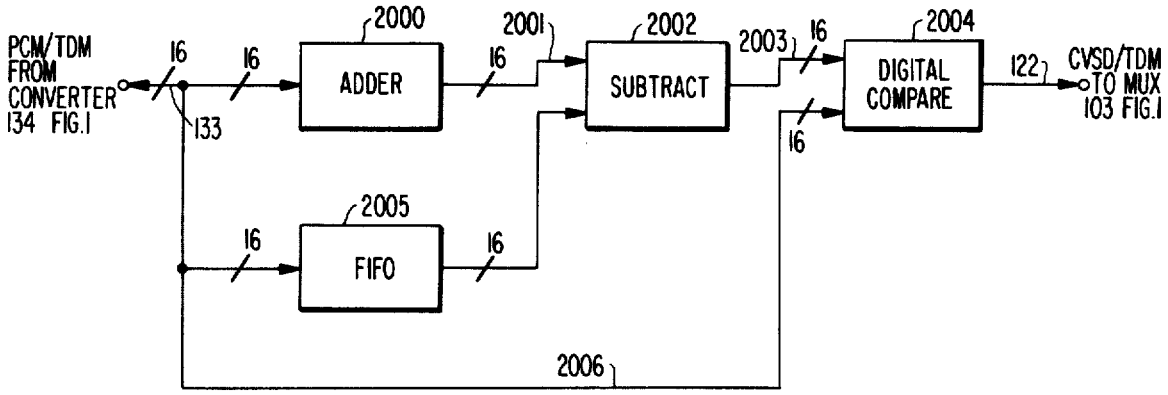
FIG. 10A CONFERENCE SUMMER

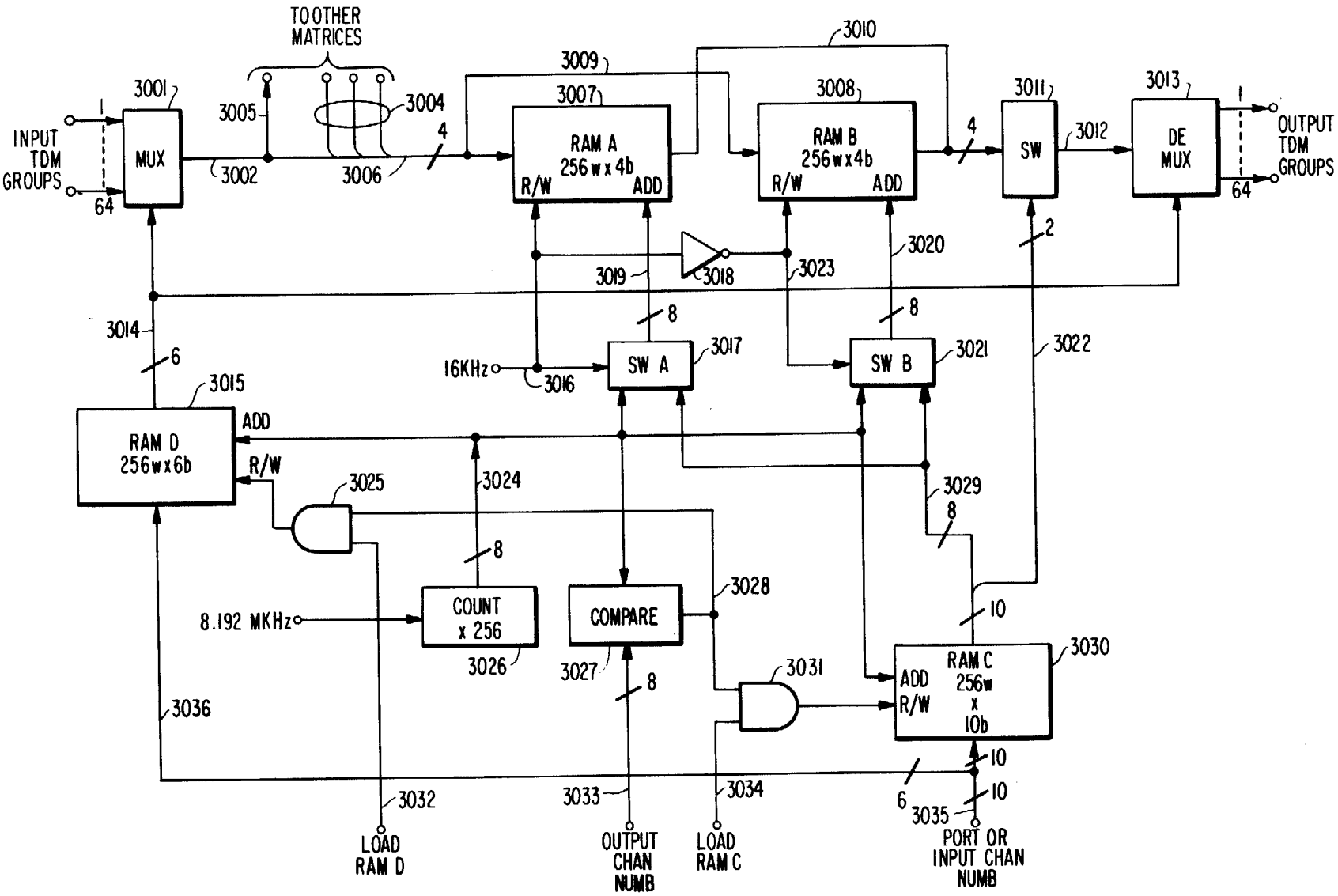
FIG. 12 LARGE MATRIX EXAMPLE

ADAPTABLE TIME DIVISION SWITCH

Matter enclosed in heavy brackets [ ] appears in the original patent but forms no part of this reissue specification; matter printed in italics indicates the additions made by reissue.

BACKGROUND OF THE INVENTION

The invention is in the field of telephone and data switching systems and more particularly is a telephone data switching system which is adaptable and is capable of switching analog and several different types of digital signals.

Switching systems in general have been in use for many years, the most common being the type used by local telephone companies for switching analog signals. Basically, these systems include a matrix of switches which selectively connect incoming lines to outgoing lines. Such switches are adaptable for continuous analog signals which emanate from the standard home telephone set. In recent years switches have been designed to switch digital signals. The digital signals typically represent data or digitally converted analog voice signals. The digital switching systems typically operate on a time divided basis wherein multiplexed digital channels are in a first sequential order at the input side of the switch but are in a second "switched" sequential order at the output side of the switch. Timing units divert the output digital channels into respective output lines for transmission to subscribers.

The most conventional format of the digital signals is the PCM format wherein the instantaneous amplitude of an analog signal, e.g., voice, is converted into a group of bits, typically an 8-bit signal, which digitally represents the analog amplitude. Other types of planned telephone sets use CVSD digital signals. The latter designation stands for continuously variable slope delta modulated signals and is a known form of delta modulation. In addition to the various types of digital signals used or planned for calls, there is an additional variable which one must consider in designing a switching system. Signals may arrive at a switching system on either trunks or loops. As is commonly used in the art, and as those terms are used herein, a loop simply means a line (input and output) which is the connection between a telephone instrument and the switching system. A trunk is simply a line (input and output) which is a connection between switches. A digital trunk is multi-channel. For example, a trunk may carry CVSD/TDM, [analog/TDM,] *PAM/TDM,* or PCM/TDM. Also, as will be apparent, clusters of digital telephones may be multiplexed to form a loop group. An additional variable faced by switching systems is that the incoming signals on the digital trunks may be synchronized to the timing of the switching system or they may be asynchronous with respect to the timing of the switching system. [COnsequently,] *Consequently,* in the case of asynchronous signals some means must be provided for insuring that the incoming digital signals are time corrected so that they can be properly operated upon by the switching system.

In general, the evolution in the art has been from analog to asynchronous digital communications to planned synchronous digital communications. A problem with existing switching systems is that they cannot handle the evolution. Thus, typically, when a change over is made for several connections to a switch a new switching system has to be installed.

SUMMARY OF THE INVENTION

In accordance with the present invention an adaptable switching system for telephone and data is provided for handling analog and various types of digital calls, synchronous and asynchronous. The actual switching part of the system is a time division matrix which operates on CVSD/TDM digital signals by rearranging the order of the CVSD/TDM channels. Consequently, all input signals are converted into the CVSD/TDM format for application to the time division matrix. Also, the output signals from the time division matrix are converted back into the respective analog, PCM, etc., necessary for connection to the outgoing loops or trunks. One particular feature of the switching system is a unique all digital CVSD to PCM converter.

It is a principal object of my invention to provide a cost-effective evolutionary circuit switch suitable for automatic telephone call placement.

It is another object of my invention to provide an automatic circuit switch operable in either the present analog signal environment, or in the future all-digital signal environment.

It is yet another object of my invention to provide a highly adaptable circuit switch utilizing unique conversion techniques and capabilities.

It is still another object of my invention to provide a low-cost, small size automatic circuit switch that is capable of use in tactical military environments, while at all times providing highly reliable circuit switch operation.

These and other objects, features and advantages will be more apparent from a study of the appended drawings.

BRIEF DESCRIPTION OF THE DRAWINGS

FIG. 1 is a block diagram of a preferred embodiment of the adaptable time division switch showing the relationship between the various signal input/output terminals and the switching mechanism.

FIG. 2 is a more detailed block diagram of a time division switching matrix and the timing memory and control system of FIG. 1.

FIG. 3 is a time graph of channel numbers appearing at certain points in FIG. 1 and is provided as an example of channel switching carried out by the apparatus of FIGS. 1 and 2.

FIG. 9 is a digital circuit, using parallel adders and parallel by bit transfer, for converting CVSD signals into PCM format.

FIG. 10A is a block diagram of a conference summer, which is used in the system of FIG. 1 to handle conference calls.

FIG. 12 is a block diagram of an alternative time division matrix.

DETAILED DESCRIPTION OF THE PREFERRED EMBODIMENT

GENERAL

Figure 4:
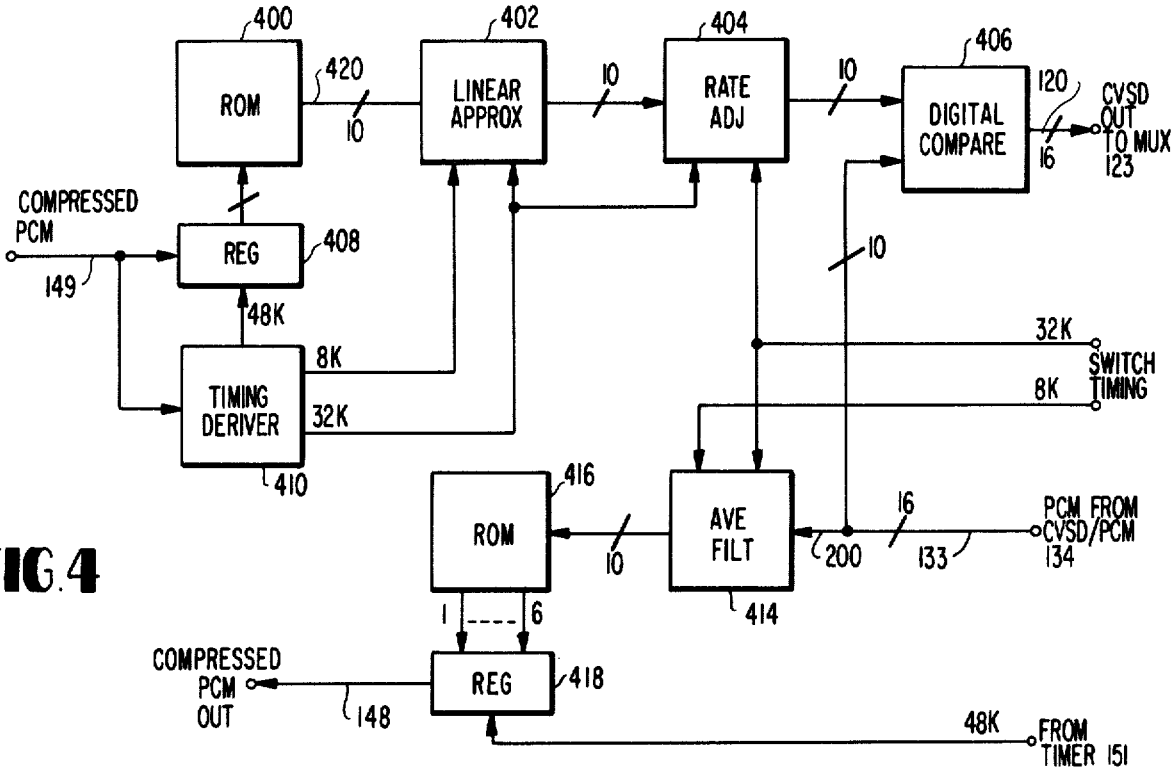
FIG. 4 is a detailed block diagram of one embodiment of a PCM-CVSD interfacing circuit which may be used as part of FIG. 1.

The preferred embodiment will be explained in connection with the description of a particular example of the adaptable time division switch. In the particular example the switch is assumed to be one that is capable of handling 192 channels. Since, as pointed out previously in connection with the above Summary of the Invention, all of the signals are converted into CVSD/TDM format, the 192 channel capability of the switch is tantamount to a frame format of 192 time slots, each time slot occupied by a single CVSD bit. The system timing is further assumed to be 32 kilobits per second per CVSD channel. Thus, the system will include a basic, but conventional, clock which provides timing signals at multiples and sub-multiples of 6.144 megabits per second (32kbps/ch × 192 ch). Since timing for operating upon digital signals is conventional and further since a detailed showing of such timing would simply amount to a tremendous plurality of timing lines drawn from a oscillator timing unit to the individual blocks, the specific timing will not be described in detail herein. The timing apparatus, however, will be apparent to anyone of ordinary skill in the art in view of the description that will follow.

Referring now to FIG. 1, the adaptable time division switch is illustrated in functional block diagram form. Those blocks which are not described in greater detail herein are conventional. The time division matrix portion of the switch, i.e., the part that does the actual switching, comprises multiplexer 123, matrix random access memory (RAM) 127, demultiplexer 129, and a timing memory and control system 124. The numbers which are circled adjacent the lines throughout the drawing represent the number of channels capable of being carried by the designated lines. Thus, for example, the output of the multiplexer is in the format of 192 CVSD/TDM channels. In general, the multiplexer 123 has a plurality of input ports to which CVSD signals are connected. Some input ports may have single channel CVSD signals whereas others may have a plural channel CVSD/TDM. The timing memory and control circuit 124 controls the timing by which the multiplexer connects the input ports to the output line 126. The channel signals are entered into the matrix RAM 127 under control of the timing memory and control system 124. In the preferred embodiment, the signals are entered into sequential addresses of the matrix RAM. The channel signals are also read from the matrix RAM under control of circuit 124. The order of read-out is controlled in dependence upon signalling information stored in a memory to be described hereinafter. The demultiplexer 129 is the inverse of multiplexer 123. The channels are separated and applied to individual output ports in dependence upon the control signals from the timing memory and control circuit 124.

TIME DIVISION MATRIX

Further details of the time division matrix are shown in the block diagram of FIG. 2 wherein the blocks indicated by numerals 123, 127 and 129 correspond exactly to the blocks of the same numbers in FIG. 1. The remaining elements of FIG. 2 comprise the timing memory and control circuit 124. The elements of the timing memory and control circuit which control the multiplexer, demultiplexer and matrix RAM comprise a multiplexer control random access memory 405, a matrix control random access memory 408, a switch means 406, and a counter 407. The gates 410 and 411 and the comparator 409 are provided for loading desired information into the random access memories 405 and 408.

Random access memory 405 is a 192 word by 5-bit memory. Each five bit word identifies one of the 32 input ports of multiplexer 123 and a corresponding output port of demultiplexer 129. Consequently, when multiplexer 123 has applied thereto a given 5-bit word from memory 405, the multiplexer connects the designated input port to the output line 126, and the demultiplexer connects input line 128 to the designated output port. The random access memory 405 is cycled at the frame rate and, consequently, the 192 words in the memory 405 determines the order of the channels on line 126. Consequently, based upon the assumed clock rate mentioned above, the words from RAM 405 are read out at the rate of 6.144 MHz per second, and the RAM completely recycles at the rate of 32 frames per second. The latter is accomplished under control of counter 407 which receives clock pulses at the 6.144 MHz rate and resets at 32 frames per second. For example, when the counter is at a count of 0, the word at address 0 is read out. When the counter is at count n the word at address n is read out. It is thus apparent that the signals at the input ports 0 through 31 of multiplexer 123 can be transferred to line 126 in any desired order by simply altering the words stored in random access memory 405.

The 192 channels, which is CVSD/TDM are completely represented by 192 bits of non-return to zero digital data, are stored sequentially in the matrix RAM 127 during the first half of each bit period. Thus, for example, during the first half of a bit period, the positive portion of the 6.144 MHz clock pulse causes the bit at the input to matrix RAM 127 to be written into the RAM 127 at the address corresponding to the count in counter 407. The positive portion of the clock pulse activates the write (W) mode of the R/W input to RAM 127 and also causes switch 406 to connect line 414 to output 161 of the switch 406. The latter output provides the address to the matrix RAM. During the second half of each 192 channel bit period, the clock pulse is at its negative portion and thereby causes the matrix RAM 127 to be in the read-out mode. The negative portion of the clock pulse also causes switch 406 to connect output 430 from the matrix control RAM 408 to the address terminal of matrix RAM 127. Consequently, the read-out is controlled by the words stored in RAM 408. The latter RAM is a 192 word by 8-bit random access memory which operates substantially identically to the RAM 405. Each word is 8-bits because of the needed capability of addressing 192 locations of matrix RAM 127. The RAMs 405 and 408 are loaded with information from a processor, not shown, which processes the signalling information from the subscribers (i.e., the information from subscribers indicating what lines are being called, etc.). The processor itself may be a conventional device and forms no part of the present invention. The information to be loaded into either the multiplexer control RAM 405 or the matrix control RAM 408 is applied to line 416. Line 416 is eight lines and is refered to as an 8-bit line. Five of the lines are connected to RAM 405. All eight lines are connected to RAM 408. To load RAM 405, line 419 is activated and 5-bit information words designating input ports and output ports are applied to line 416. Eight bit addresses are applied to line 418. Each 5-bit information word has an 8-bit address associated therewith. When counter 407 reaches a count corresponding to the address on line 418, an output from comparator 409 gates an AND gate 410 to cause the 5-bit information word on line 416/415 to be written into RAM 405 at the latter mentioned address.

The RAM 408 is loaded in an identical manner. The words loaded are 8-bit information words representing the position of a bit on line 126, and the address words applied to line 418 represent the position of said bit on line 128. AND gate 411 is activated by line 417 and the output from comparator 409.

It will be noted, that the arrangement of the time division matrix is simplified by the fact that the 5-bit word outputs from the multiplexer control RAM 405 also control the demultiplexer 129. Thus, with the exception of certain types of signalling and supervision signals and those signals which utilize the CVSD to PCM converter 134 (FIG. 1) most of the signals are connected so that corresponding input port channels to multiplexer 123 and output port channels from demultiplexer 129 form full duplex signals. For example, if a signal from a given digital telephone appears at input port 8 multiplexer 123 in the ninth channel slot of a CVSD/TDM signal at port 8, the signal to be fed back to said given telephone would appear at output port 8 pf demultiplexer 129 in the ninth channel slot. This process is illustrated graphically in FIG. 3 which shows the signal organization at the multiplexer input ports and the demultiplexer output ports for an assumed set of conditions. It is assumed that telephone subscriber 1 whose output information is designated by x is communicating with telephone subscriber 2 whose information is designated by y. It is further assumed that the information from subcriber 1 appears in the channel 9 slot at multiplexer input port 8 of a 12-channel CVSD/TDM input. The latter is designated in FIG. 3 as mux port 8. It is further assumed that the [information y] *y information* from subscriber 2 appears at the multiplexer input port 10 in the channel 3 position of a 6-channel CVSD/TDM input. This is illustrated in the second line of FIG. 3. It will be noted that the frame times are all the same and are determined by the 192 channel CVSD capability of the time division matrix. It is further assumed that RAM 405 and RAM 408 of FIG. 2 cause the x information and the y information to be placed in channel slots 129 and 78, respectively, on line 126. The matrix control RAM 408 will operate, in the assumed example, to cause the y information in matrix RAM 127 to be read out into the slot 129 and the x information to be read-out into slot 78 of line 128. In [order] *other* words, for the full duplex case the x and y slots between the communicating subscribers are switched by the operation of time division matrix. As a result of the switching, and further as a result of the signals from RAM 405, the outputs on the demultiplexer output port would appear as indicated in the fourth and fifth lines of FIG. 3.

Referring back to FIG. 1, the input/output terminals of the adaptable time division switch are indicated as being connected to a CVSD/TDM trunk, an analog loop or trunk, a CVSD loop, and a PCM/TDM trunk by a matching or interface circuit. The latter circuits are well known in the art, and they are included to provide isolation and impedance matching. It will be apparent that the single illustration of each of the latter type of external signals is provided only by way of example and it will further be apparent that the system connects to multiple trunks and loops of the types mentioned. In order for the external signals to "fit" into the time division matrix described above, it is apparent that the analog signals and the PCM signals must be converted into a CVSD format. Furthermore, the CVSD loop and trunk signals, if not properly timed to the switches' timing system, must be altered in time, i.e., synchronized.

One of the basic functional block elements of the system which enhances the conversion of non-CVSD signals into CVSD format and which also enhances the reconversion of CVSD signals into PCM and analog format is the CVSD to PCM converter 134. Detailed block diagrams illustrating examples of such a converter 134 will be described subsequently. For the present, it is assumed that the converter 134 is a 64-channel device. That is, it receives 64 CVSD/TDM input channels and provides 64 PCM/TDM output channels. In the example shown it is assumed that 32 of the input channels correspond to a selected set of 32 of the 192 channels on line 26 and the other input channels to converter 134 correspond to a corresponding numbered 32 channels on the output line 128. This particular adaptation is quite suitable for the full duplex arrangement described previously. The particular channels selected from lines 126 and 128 may be selected by a simple timing arrangement. One convenient timing arrangement would be to select every sixth channel on line 126. In other words, assuming the first channel in the frame is number 0 and the last channel is numbered 191, channels 0, 5, 11, ..., 85 [woulld] *would* be assigned by time selection to the converter 134. The same numbered channels from line 128 at the output of the matrix RAM 127 would also be assigned to the converter 134 for conversion into PCM. It should be understood, however, that in view of the fact that a simple programmable multiplexer is used in the time division matrix previously described, the particular selection of channels for the converter 134 could be quite different from the case mentioned herein and furthermore can be varied from time to time. Additionally, in the preferred embodiment, the converter 134 arranges the output channels so that the corresponding numbered channels from lines 126 and 128 are adjacent in the output PCM/TDM format. Thus, if the signal from an analog telephone appears in the channel 8 position at the output of converter 134, then the signal in the channel 9 position at the converter output would be the signal which is ultimately received by that same analog telephone. That particular format simplifies the timing on the output side of the converter 134. For example, in the 64-channel format at the converter output the even numbered channels would be used as the feedback signal for converting input signals into the CVSD format (to be explained below), whereas the odd numbered channels would be [outputed] *outputted* either directly to the PCM/TDM trunk or, after analog conversion, to the analog loop or trunk.

SWITCHING OF ANALOG INPUTS

The matter in which analog signals on the analog loop or trunk are handled by the adaptable time division switch will now be described. The analog loop or trunk is connected to an analog matching circuit 101 which may be a conventional signal matching circuit. The analog signals appear at the output of matching circuit 101 on line 104 and are multiplexed in an analog multiplexer into a PAM/TDM (pulse amplitude modulated/-time division multiplex) format. In accordance with the specific example described herein the system can handle up to 32 separate analog channels. Each PAM pulse, which represents a single channel of the analog input, is converted into CVSD format via the apparatus including differential amplifier 110, latch 116, time division matrix previously described, [CVSd] *CVSD* to PCM converter 134, and digital to analog converter 114. The latter apparatus is particularly adapted for the multichannel analog to CVSD conversion. However, the apparatus will initially be described in terms of a single PAM to CVSD conversion in order to simplify the explanation. As in all delta modulation systems, the input analog signal to be converted is compared with a feedback signal. In this case, assuming a given analog input signal in the PAM format on line 109, the latter signal is applied to differential amplifier 110 along with a feedback analog signal on line 107. The output on line 115 will correspond either to a 0 or 1 bit depending upon the comparison. The latter bit is the CVSD signal for the analog channel in question. The CVSD bit is applied via latch 116, whose function will be described hereafter, to an input port of the multiplexer 123. As a result of the multiplexer operation the particular CVSD channel bit appears in the output of the multiplexer on line 126. The particular position of the CVSD bit in question on line 126 depends, of course, upon the format control of the multiplexer control RAM 405 (FIG. 2) described previously. For purposes of explanation, it will be assumed that the 32 analog channels which the system is capable of handling are multiplexed into channel positions 0, 5, 11, ..., of the 192 CVSD/TDM format on line 26. It will be assumed that the particular single analog channel now being discussed is in time [sslot] *slot* or channel slot 11 on line 126. The bits in time slot 11 are applied as an input channel to the CVSD/PCM converter 134. The information in question appears as a PCM signal at the output of converter 134 in time slot or channel slot 4. It will be recalled that the converter 134 arranges the channels from lines 126 and 128 in an odd/even adjacent format for corresponding channels. Thus, for example, channel 11 on line 126 will appear as a PCM signal in output channel 4 of converter [124] *134* whereas channel 11 on line 128 will appear in channel slot 5 in the output of converter 134. The former PCM signal is converted into an analog pulse by the digital-to-analog converter 114. The output therefrom corresponds to the feedback analog signal for the particular incoming analog channel discussed.

As pointed out previously in connection with the output of converter 134, every other PCM channel in the output represents information to be transmitted from the switch to subscribers. That information obviously is not intended to be used as feedback information for the analog to CVSD converter. Only 32 out of the 64 output channels from converter 134 are intended to be used as feedback for the 32 input analog channels. This particular problem is solved by latch 116. In operation all 64 PCM channels, after conversion into analog format by the converter 114, are compared in differential amplifier 110 with the respective 32 input analog channels. However, latch 116 is timed so that only every other bit on line 115 passes therethrough on line 118 to the multiplexer. Consequently, only the correct CVSD bits corresponding to the incoming analog channels will be applied to multiplexer 123. It will be noted that the analog channels, although switched by the time division matrix described previously, do not pass through the demultiplexer in any form. The analog signals, after conversion into CVSD form, and after time slot switching by the matrix RAM 127, are applied to the converter 134 and subsequently reconverted into analog form by the digital-to-analog converter 114. The analog outputs from converter 114 corresponding to the outgoing analog signals to be sent back to the subscriber are picked off by a plurality of conventional sample and hold circuits 106 which are properly timed to apply the desired analog signal to the desired analog loop connected to the subsciber. The output from the sample and hold circuit 106 is then applied via line 105 and through the analog matching circuit to the analog loop or trunk 102. The sample and hold circuit 106 also contains a filter so that the signal on line 105 going to the matching circuits 101 is the reconstructed audio signal.

A dual-tone multiple frequency (DTMF) *detector* unit 113 is shown as part of the analog system in FIG. 1. Analog DTMF devices are well known in switching systems. As is common in prior art analog switching systems, when an off-hook condition is detected for a touch-tone telephone the processor assigns a DTMF *detector* to receive the dialing dual-tones to provide the destination address. The DTMF detector 113 is used herein in the prior art manner. The only unique feature in connection with the DTMF *detector* herein is that the dual-tones, which are in-band analog signals, go through the analog-CVSD-PCM-analog conversion before being applied via sample and hold 111 to the assigned DTMF *detector*. The processor, to which the DTMF *detector* is indicated as being connected, and its function are state of the art in switching systems.

CONFERENCE CALLS

The system shown in FIG. 1 also includes a simple conference call device. In general, the conference call device operates on the signals in selected channels which are set aside for conference calls. The maximum number of subscribers who may participate is limited by the number of channels set aside for conference calls. The selected incoming channels are combined in a summation means which [sumas] *sums* all but one channel. For example, assume slots m, n and p on line 126 contain incoming information from callers 1, 2 and 3.

The signals in slots m, n and p are diverted by timing signals to CVSD/PCM converter 134 and the corresponding PCM signals are applied to conference summer 135. For each input, the summer adds all other channels and provides an output intended for the corresponding subscriber. Thus, the summer provides a PCM signal which is the sum of n and p, reconverts the latter sum into a CVSD signal via a PCM/CVSD converter contained in block 135, and provides the latter signal to multiplexer 126. The switching mechanism places the latter signal in the slot which is designated to subscriber 1. Thus, subscriber 1 receives the voice signals emanating from subscribers 2 and 3. In a like manner, subscribers 2 and 3 receive the voice signals from subscibers 1 and 3 and subscribers 1 and 2, respectively. The elimination of the subscriber's own voice signal from the summation, eliminates undesirable echo.

Figure 10B:
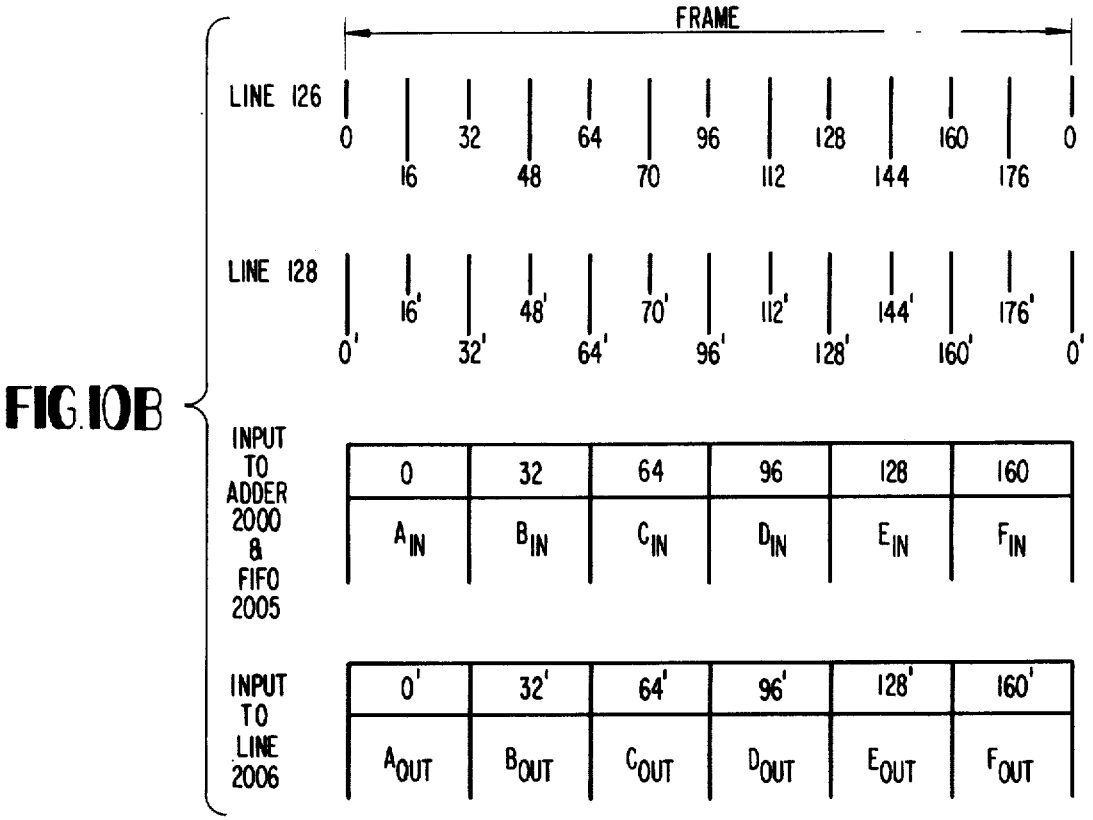
FIG. 10B is a time graph of channel slots in a system frame and is helpful in understanding the operation of the conference call feature of the system of FIG. 1.

The details of conference summer 135 are illustrated in FIG. 10A, and will be explained in connection with timing graphs illustrated in FIG. 10B. In general, all incoming channels which participate in the conference call are added each frame by adder 2000. The same signals are applied to a first in first out (FIFO) shift register 2005. The adder output and the FIFO output are subtracted in subtractor 2002. The resulting output on line 2003 is a PCM channel containing the sum of all but one channel. The PCM signal is converted into CVSD by comparing it with a PCM feedback signal and providing a 0 or 1 output from comparator 2004 depending on which input is larger. The feedback PCM is derived from the signal on line 128 which corresponds to the signal on line 2003.

A better understanding will be had by assuming a set of fixed conditions and then describing the flow of data through the conference summer 135 and associated logic. It was previously assumed that 32 full duplex channels were time-gated into CVSD/PCM converter 134 from lines 126 and 128. That assumption will apply here, with the added assumption that 12 of the duplex channels are assigned for conference calls. As we will see this permits six subscibers to participate in conference calls. Using numbers to designate channels, letters to designate subscribers, and primes to designate outgoing channels on line 128, we have the following conditions:

| Subscribers | Incoming Channel No. on line 126 | Outgoing Channel No. on line 128 |
|---|---|---|
| A | 0 | 0′ |
| B | 32 | 32′ |
| C | 64 | 64′ |
| D | 96 | 96′ |
| E | 128 | 128′ |
| F | 160 | 160′ |

For the system to operate properly, channel 0, contains incoming information A whereas channel 0′ contains outgoing information A′ (where $A'=B+C+\lambda-D+E+F$).

It will also be recalled that the channels on line 126 are switched by matrix RAM 127 and the control circuit 124. Thus, to provide slots for the outgoing signals on line 126, time slots 16, 48, 70, 112, 144 and 176 are made available. The data in these channels are switched to slots 0, 32, 64, 96, 128 and 160, respectively. Referring to FIG. 10B, the channel designations are illustrated by short strokes and long strokes, respectively. The short strokes indicate that the data in the channel represents incoming information from a single subscriber, e.g. slot 32 carries incoming data from subscriber B. The long strokes indicate that the data in the channel represents outgoing summed data, e.g., slot 48 carries outgoing data for subscriber B.

It will also be recalled that in the preferred arrangement, the CVSD/PCM converter 134 receives full duplex channels. Thus, channels 0, 0′, 32, 32′, etc., are gated into 134. These channels, after conversion to PCM are gated to line 133, which is the input to conference summer 135.

The input channels which are applied to adder 2000 and FIFO 2005 are shown in FIG. 10B. At the beginning of frame n+1, when channel $0_{n+1}$ appears at the inputs to adder 2000 and FIFO 2005, channel $0_n$ appears at the output of FIFO 2005. The output from adder 2000 on line 2001 will be the sum $A+B+C+\lambda-D+E+F$ from frame n. Consequently, the output from subtractor 2002, occurring at a time corresponding to channel 0 of from n+1, is $A_{OUT}$ in PCM, or the sum $B+C+D+E+F$ from frame n. Thus, $A_{OUT}$ is applied as one input to digital comparator 2004. The other input is the PCM signal from channel 0′ of frame n+1. This corresponds to $A_{OUT}$ Also. The output on line 122 is thus $A_{OUT}$ in CVSD.

Referring to FIGS. 1 and 10A simultaneously, it is seen that $A_{OUT}$ is applied back to mux 123. According to the arrangement described previously, the timing and memory control 124 places $A_{OUT}$ in slot 16 of line 126. Subsequently, slots 0 and 16 are switched by RAM 127 and control circuit 124 so that $A_{OUT}$ in CVSD now appears in slot 0′. Next, $A_{OUT}$ in slot 0′ is converted to PCM and (1) used as a feedback signal in conference summer 135 as described above and (2) converted to the proper format and sent out to subscriber A.

It will be noted that the proper timing can be accomplished simply by dividing each frame into 192 time slots and providing an integral number separate of timing pulses for each time slot. The appropriate timing pulses are connected to gate the appropriate slot/data to the units described.

SWITCHING OF PCM INPUTS

Referring back to FIG. 1, those signals which are in PCM/TDM format are received by the switch via line 149 and transmitted from the switch via line 148. Typical PCM signals are either 6-bits or 8-bits per sample and provide analog compression before the PCM conversion to improve dynamic range. Also, it will be noted that standard PCM is formed by sampling an analog channel at 8 KHz and converting each sample into an eight or six bit digital number representing the amplitude of the sample. Techniques for compressing the PCM samples are well known in the art. The example described herein is for a 6-bit compressed PCM.

Since the sample rate on the trunk 149 and 148 is 8 [KH z] *KHz* per channel, and since the switch operates at a basic clock rate of 32 KHz per CVSD channel, and further since the [truck] *trunk* signals are not in natural sync with the switch time, means are provided for increasing the rate to 32 KHz and for synchronizing the trunk rate to the switch clock. The functions of synchronization, rate conversion, linear/compressed PCM conversion, are carried out by the input and output interface circuits 150, 147 working in conjunction with the CVSD/PCM converter 134. Thus, the PCM/TDM signals at 8 KHz per sample per channel appearing on input trunk 149, are converted by units 150 and 134 into CVSD/TDM signals at 32 kbps per channel on line 120. The CVSD/TDM signals will be processed in the manner previously described. The switch CVSD/TDM signals could be routed by demultiplexer 129 to the output interface circuit 147, but that would require a CVSD/PCM converter in the output interface circuit. However, since the switch already includes CVSD/PCM converter 134, the latter is used for the PCM/TDM signals. Thus, in the embodiment of FIG. 1 the CVSD/TDM signals on line 128 which are to be eventually [outputed] *outputted* on trunk 148, are routed to CVSD/PCM converter 134 by timing signals. The PCM/TDM signals at the output therefrom are routed by proper timing signals to output interface 147 where they are altered from a sample rate of 32 KHz per channel to a sample rate of 8 KHz per channel and subsequently compressed and applied to trunk 148.

A specific example of the input and output interface circuit 150 and 147 is illustrated in FIG. 4. The example will be explained for a single channel 6-bit compressed PCM. It will be apparent that the system is capable of operating on 6 or 8-bit linear or compressed PCM. Further, the system described is capable of operating on multiplexed PCM (i.e. PCM/TDM) merely by adding a few FIFO (first in/first out) circuits and registers.

As shown in FIG. 4 the 6-bit PCM samples, occurring at the 8 KHz rate are applied to register 408 whose output serves as an address for ROM (read only memory) 400. ROM 400 is a 64 word by 10-bit memory. Each 6-bit number selects a different address to cause the 10-bit word therein to be read out onto line 420. The 10-bit words on line 420 are linear PCM samples at 8 KHz. The samples could be upped to a 32 KHz rate by simply repeating each sample four times. However, this repetition, indicated by samples A, B and C in FIG. 5, would result in some distortion. Therefore, a preferred technique is to interpolate between successive samples on line 420. This could be accomplished by including in linear approximator 402 binary logic which effectively draws a straight line between successive samples, as shown by D, E and F in FIG. 5. The logic operations consist of subtracting adjacent incoming PCM numbers, dividing the difference by four, and successively adding the divided difference to each interpolated sample at D, E and F. Clock signals, derived from the incoming PCM samples in a known manner by timing deriver 410, are applied to linear approximator 402 for the purpose of timing the read-in/read-out of the samples at 8 KHz and 32 KHz, respectively.

An external PCM generator device normally operates on its own timing and runs independent of the switch timing. Therefore, the 32,000 samples per second from linear approximator 402 will time slip relative to the switch timing of 32,000 bps. A rate adjustor, 404, is provided for correcting this time slippage. The rate adjustor receives the 32 kpbs clocks from the timing deriver 410 and also receives the 32 kbps clocks from the switch time circuits 151 (see FIG. 1). The rate adjustor operates in a known manner to either repeat or delete one of the samples as required to keep the output of the rate adjustor time synchronous with switch timing. The number of such deletions or repetitions per second will be quite small. For example, the TD-660 operational military PCM/TDM generator is accurate in timing within 100 parts per million. At 100 parts per million time difference the number of corrections would be $32{,}000\times100\times10^{-6}$ per second per channel or 3.2 corrections per second.

The 10-bit PCM samples at the output of rate adjustor 404 are then converted into CVSD format by a PCM-to-CVSD converter comprising digital comparator 406 which compares the 10-bit incoming PCM with a selected set of 10 PCM bits from the converter 134 of FIG. 1. The digital comparator 406 compares digital amplitude values [like] *in the same manner* the difference amplifier 110 of FIG. 1 compares analog amplitudes. The CVSD/TDM output on line 120 is applied to mux 123 of FIG. 1.

Figure 11:
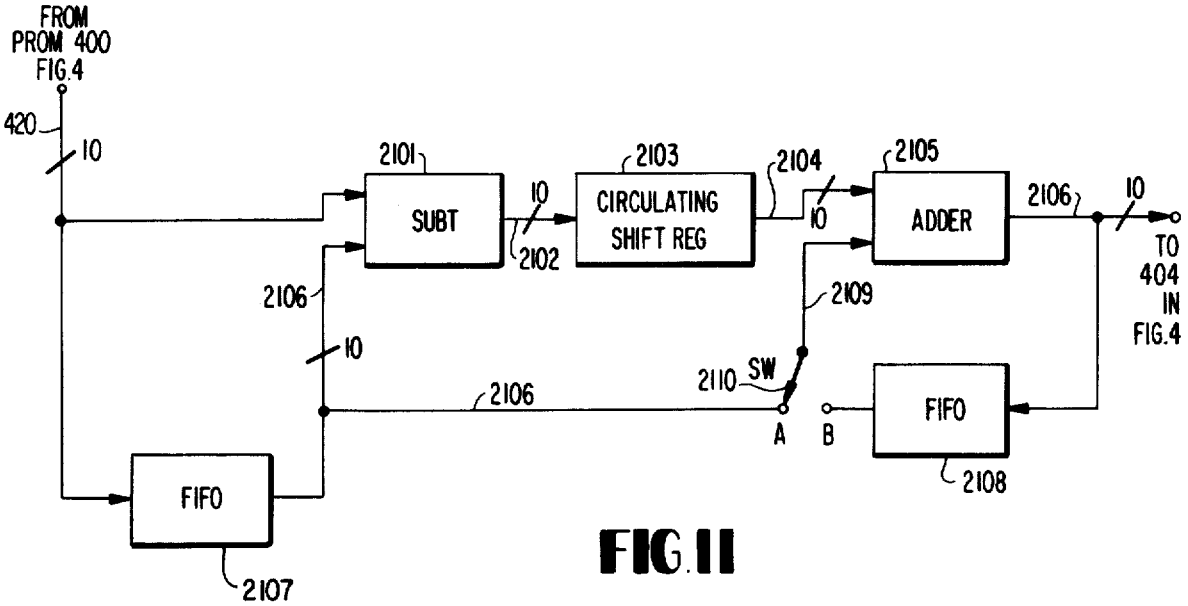
FIG. 11 is a linear approximator which can be used as part of the PCM-CVSD interface of FIG. 4.

FIG. 11 shows the linear approximator 402 of FIG. 4 in greater detail. It must be remembered that at this point in the processing of the incoming PCM/TDM signal a "frame" is 1/8000=0.000125 seconds=125 microseconds in duration, an n channel PCM/TDM signal has the n channel time division multiplexed in a 125 microsecond frame period.

Figure 5:
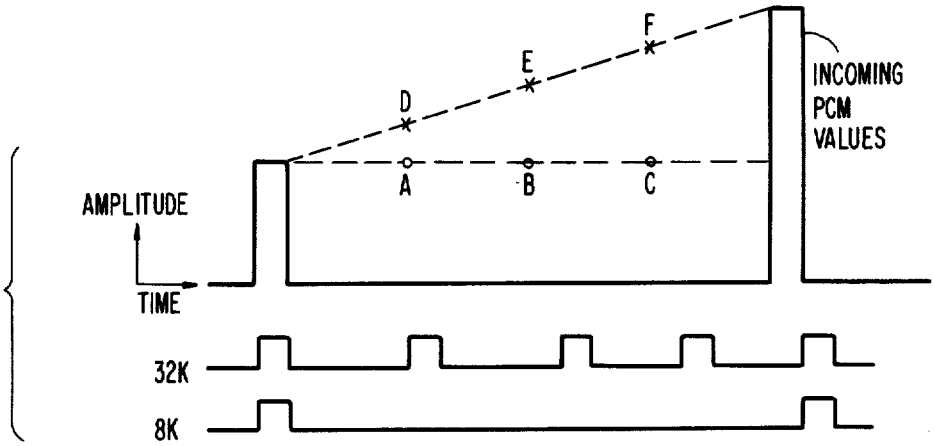
FIG. 5 shows pulse waveforms occurring in the interface circuit of FIG. 4.

The FIFO 2107 provides a frame of storage so that the last PCM number of a channel can be subtracted from the previous PCM number for that channel as indicated in FIG. 5. The subtractor output 2102 is the binary number representing the difference between two successive PCM numbers for a channel.

The circulating shift register 2103 enables the difference numbers to be held in storage and used for the successive additions indicated as required to produce points D, E and F in FIG. 5.

The switch 2110 is initially connected to terminal A so that the value of PCM number D in FIG. 5 is produced by adding the previous PCM number from lead 2106 to the difference 2102 in adder 2105. The adder output 2106 is fed to the rate adjustor 404 in FIG. 4 and to the second FIFO 2108. While points E and F of FIG. 5 are being produced the switch 2110 is connected to terminal B. Then the PCM value from point D of FIG. 5 appears at 2108 and through switch 2110 to adder input 2109, and the difference from the circulating register is added to the value of point D to produce first point E and later point F by adding the difference to point E.

After point F is generated, the switch 2110 returns to terminal A and the FIFO and circulating registers are filled with new data as just described.

The output interface circuit of FIG. 4 is simpler than the input interface circuit because the former does not require a closed loop arrangement. The 16-bit PCM samples from converter 134 (FIG. 1) are applied to an averaging filter 414. The filter averages the values of the last four PCM values to produce PCM numbers at the rate of 8,000 per second in response to PCM numbers at 32,000 per second per channel received by the filter.

For the example described, the incoming 6-bit compressed PCM is converted into 10-bit linear PCM using a 64 word by 10-bit (64W×10b) ROM 400. On the output side the conversion is from 10-bit linear PCM to 6-bit compressed PCM using a 1024W×6b ROM 416. The CVSD/PCM described herein provides 16-bit PCM. The conversion between 16-bit PCM and 10-bit PCM is simply made by deleting the six low order bits or adding six zeroes, depending on the direction of conversion. Thus, although line 133 from CVSD/PCM 134 carries 16-bit parallel PCM words, only the 10 most significant bits address the ROM 416. The 6-bit compressed PCM read-out of ROM 406 is applied to register 418 and shifted out serially *bit* by bit by means of a 48 kbps per channel clock. The latter clock may be simply derived from timing circuit 151.

SWITCHING OF CVSD INPUTS

Each CVSD loop, only one of which is illustrated in FIG. 1, is adapted to be connected to a new digital subscriber voice terminal [(DVST)] *(DSVT)* which is the new military digital and secure telephone. However, for the purpose of explaining the present invention it will be understood that the loop signals can emanate from any source of CVSD signals.

Figure 6:
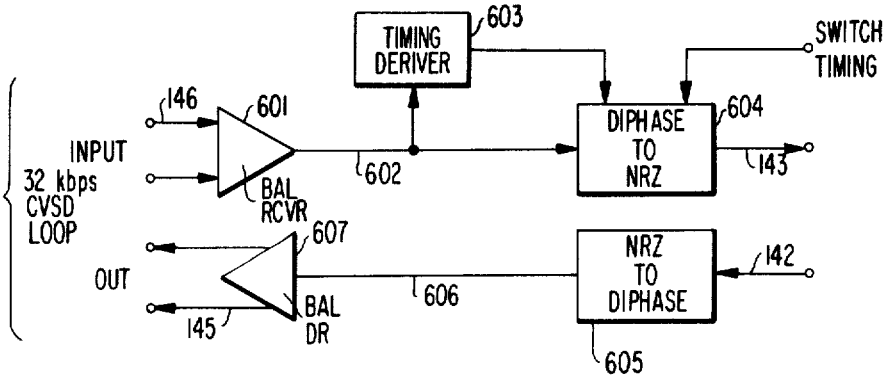
FIG. 6 is a block diagram of one embodiment of a CVSD loop matching circuit for use in the system of FIG. 1.

The digital matching circuit 144 is state of the art and provides isolation and signal form conversion where necessary (e.g., diphase to non-turn-to-zero). An example of a matching circuit 144 is illustrated in FIG. 6 for the assumed case of a CVSD loop in the diphase format and a time division switch operating in an NRZ format. The balanced receiver 601 and driver 607 provide ground isolation similar to that provided for analog signals by transformers. Timing signals are usually supplied on a separate lead to the receiver 601. However, in those cases where there is not included a separate timing lead from the digital telephone, a timing deriver 603 of a conventional form may be provided. A diphase to NRZ converter 604 uses both signal and switch timing to produce a 32 kbps CVSD NRZ signal on line 143 having the desired bit phase relationships for the switch.

The [DVST] *DSVT* instrument referred to above operates on the timing which it receives from the signal sent to it via line 145 and slaves to the timing of the later signal. Consequently, the signals from the terminal on line 146 are synchronous with switch timing.

Referring back to FIG. 1, the multiplexer 141 and demultiplexer 140 are provided to enable multiple CVSD loops to be connected to the switch. The signals from all such loops would be arranged in CVSD/TDM by multiplexer 141.

The digital matching circuit 152 (FIG. 1) for CVSD/TDM trunks are almost identical to the matching circuits, 144, for CVSD loops. The primary [difference] *differences* are the higher timing rates and the need for TDM frame timing either as supplied or derived. A trunk is a connection to another switch, and CVSD/TDM trunks are typically in groupings which are multiples of nine channels.

The distant switch and the near switch (the one being described) may be slave synchronous. That simply means that the timing circuits of one switch are slaved or controlled by the timing signals received from the other switch. If the near switch is slaved to the incoming signal than the derived timing on lead 159 is fed to the timing circuits 151 where it drives a phase locked oscillator which serves as the central timing source for the near switch. Any given switch can be slave synchronous to only one other switch.

In lieu of slave synchronous operation, the operation may be near synchronous [of] *or* asynchronous. If the network is operating in a near synchronous mode then each switch operates from its own free running oscillator. In this case, the oscillator would be a highly stable oscillator, such as an atomic oscillator. A trunk synchronizer 157 would be added to correct the drift between distant and near switch timing. In this case the synchronizer 157 would consist of an elastic buffer of a conventional type permitting signals to be fed into the buffer at the incoming signal rate and to be fed out in synchronism with the local switch timing. Storage is provided in the buffer to permit bit slippage between the incoming and outgoing signals from the buffer over some specified time period, e.g., one day. The buffer is dumped and reset at the end of the specified period.

In asynchronous operation each switch operates with its own free running oscillator, but the stability is not good enough to utilize elastic buffers with reasonable size memories. Each signal may emanate from a different switch and therefore may have different timing. [COnsequently,] *Consequently,* separate timing compensation must be provided for each CVSD loop or trunk when there is even a single asynchronous CVSD/TDM trunk.

When the asynchronous mode exists the time division switch is operated at a rate which is slightly above, e.g., 1%, higher than normal. The timing for the incoming signal is adjusted up to the higher timing by bit stuffing usng well known techniques. Bit stuffing typically involves adding bits, called stuffed bits, so that the increased timing resulting from the stuffed bits produces the desired higher timing rate. The stuffed bits normally consist of frame bits which enable the stuffed bits to be detected, a rate adjustment bit which may contain either a valid signal bit or a stuffed bit, and a code word which identifies the rate adjustment bit as either valid or stuffed.

Signals from an asynchronous trunk, 156, require that the trunk synchronizer, 157, first remove all the stuffed bits associated with the remote switch timing and then replace them with stuffed bits to match the local switch timing. Since each signal contains its own stuffed bits, the outgoing signal, 155, from the switch will automatically be of the required stuffed format and synchronizing operations are not required.

Since each signal may have originated from a different switch and since the [DVST] *DSVT* derives its timing from the signal which it receives, then each signal from a [DVST] *DSVT* may have a different timing related to the signal sent to it. Therefore, each loop must be separately stuffed and destuffed in the input loop synchronizer circuits, 159, and the output loop synchronizer circuits 160. Correct timing must be maintained only for secure voice signals and for data signals. If the [DVST] *DSVT* is operating in clear text voice then timing corrections are not required since a slightly fast or slow timing simply causes an occasional lost or repeated CVSD bit, i.e., a minor noise perturbation. Therefore, analog signal interfaces will not require corrected timing.

CVSD/PCM CONVERSION

The [adjustable] *adaptable* switch utilizes a CVSD/PCM converter for several applications, as described above. The obvious application is to convert CVSD signals to PCM signals. It also serves as an important part of other systems.

1. In the analog to CVSD conversion system shown in FIG. 1, the analog sample on line 109 is compared with a feedback analog sample on line 107, in differentiator 110. The differentiator output is CVSD. The CVSD on line 126 is converted to PCM by the CVSD/PCM converter, which is an important part of the feedback path of the analog to CVSD conversion.
2. For digital conferencing, it is necessary to sum the signals which will be sent to any subscriber involved in the conference. The CVSD signals are converted by the CVSD/PCM converter 134 to enable easy summation of PCM signals in conference summer 135.
3. The CVSD/PCM 134 also is part of a CVSD to analog converter. The CVSD signals on line 128 which are to be sent to an analog loop are converted into analog form by first being converted from CVSD to PCM by converter 134 and subsequently being converted from PCM to analog by converter 114.
4. A CVSD/PCM converter is also used in the PCM to CVSD converter. This use is illustrated in FIG.

4. The CVSD/PCM converter is in the feedback loop of a PCM to CVSD converter.

CVSD means continuously variable slope delta and is a species of a delta encoded signal. As is well known, delta encoding comprises comparing an analog signal with the feedback analog signal and [outputing] *outputting* a 1 or 0 bit depending on the comparison. The feedback is derived by converting the delta encoded signal back into analog form. One problem of straight delta encoding is that rapid variations of the input are only slowly followed at the output. CVSD encoding is well known. Essentially, the slope of the output is varied between a high and low value to rapidly follow the input.

Figure 7:
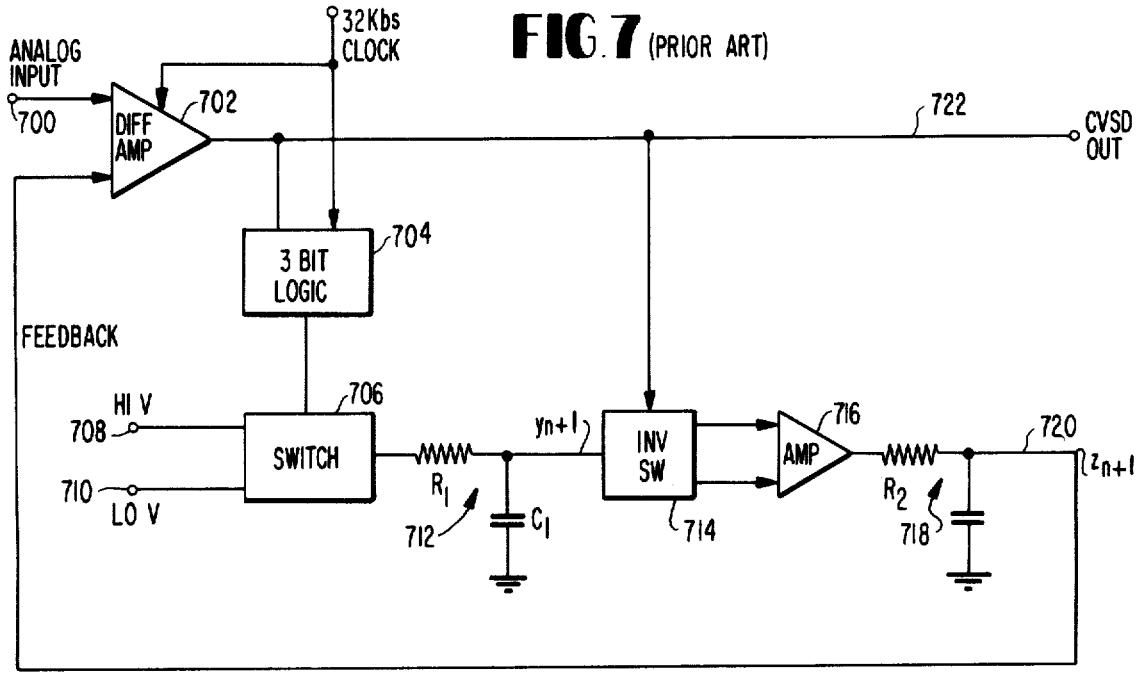
FIG. 7 (PRIOR ART)
FIG. 7 is a prior art analog circuit for converting analog signals into CVSD signals.

A starting point for understanding the novel digital CVSD/PCM encoder is an understanding of a conventional analog circuit for converting an analog input to a CVSD output. Reference is made to FIG. 7.

The analog signal at input 700 is applied to a difference amplifier 702 which is timed by a local clock at the rate of 32 kbps. Each clock pulse causes a 1 or 0 bit output depending on whether the analog input is above or below the feedback input. The output on line 722 is the CVSD signal.

The CVSD bits are clocked into a 3-bit logic circuit 704 by the 32 kbps clock pulses. The output of the 3-bit logic circuit controls switch 706.

If the three successive bits of the CVSD are all ZERO's or all ONE's, switch 706 passes the high voltage at terminal 708 to integrator 712 comprising $R_1$ and $C_1$. Otherwise, switch 706 passes the low voltage at terminal 710 to integrator 712.

The integrator is leaky and its output is defined as:

$$y_{n+1}=y_n\exp(-1/T_1F_s)+E_n(1-\exp(-1/T_1F_s)) \quad (1)$$

The terms are defined as follows:

$y_n$=previous value of y $y_{n+1}$=new value of y $T_1=R_1C_1\approx$typically 4 milliseconds $F_s$=sample rate=32 kbps $E_n$=selected high or low voltage; typically 6 volts and 0.15 volts, respectively.

The first term on the right hand side of equation (1) represents the decayed y value for the preceding y. The second term is the contribution to the output made by integrating the selected high or low voltage.

The inversion switch 714 applies $y_{n+1}$ or $-y_{n+1}$ to the amplifier. This determines whether an addition or subtraction of $y_{n+1}$ occurs, and is dependent upon the bit value of the last CVSD bit on 722. If the CVSD bit is a ONE, indicating that the input is above the feedback, $y_{n+1}$ is applied via amplifier 716 to the integrator 718 comprising $R_2$ and $C_2$. If the CVSD bit is a ZERO, indicating that the analog input is below the feedback voltage $-y_{n+1}$ is applied via amplifier 716 to integrator 718.

The output, Z, of integrator 718 is defined as:

$$Z_{n+1}=Z_n\exp(-1/T_2F_s)\pm Gy_{n+1}(1-\exp(-1/T_2F_s)) \quad (2)$$

where G is the gain of the amplifier and is typically $\approx 3$; $T_2=R_2C_2$ and typically $\approx 1$ millisecond; the first term on the right hand side of the equation represents the decay of the prior output $Z_n$; and the second term on the right side represents the integration of the amplifier output $G(\pm y_{n+1})$.

There are several disadvantages of the analog circuit shown in FIG. 7. The drift of amplifier 716 limits the attainable dynamic range and signal-to-noise ratio and causes distortion. Also, separate analog converters are required for each conversion. These problems can be substantially eliminated by substituting digital circuitry in the feedback loop.

Figure 8:
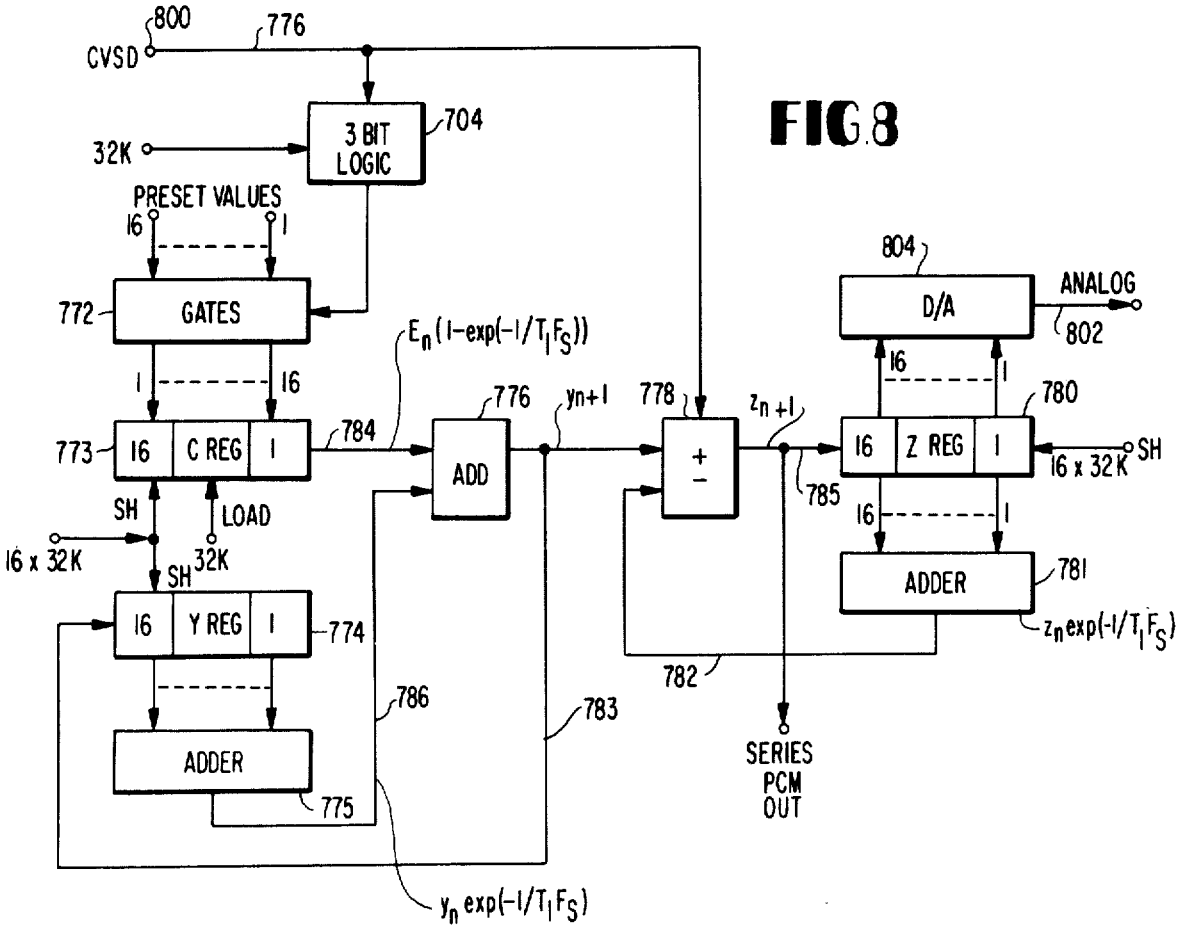
FIG. 8 is a digital circuit, using serial adders and serial by bit transfers, for converting CVSD signals into PCM format.

One embodiment of a novel all digital feedback loop is shown in FIG. 8. The input 800 is the CVSD output from differential amplifier 702 (FIG. 7), and the analog output at 802 is the feedback voltage which is applied as an input to amplifier 702. It will be noted that the system illustrated sans D/A converter 804, is a CVSD/PCM converter. This is the "serial shift and add" embodiment of the CVSD/PCM converter.

As in the case of FIG. 7, a single CVSD channel is initially assumed. The CVSD is clocked into a 3-bit logic circuit 704 which is the same as in FIG. 7. It is assumed that 16-bit words are used. Two 16-bit words are applied to a gate bank 772. One word represents the term $E_n(1-\exp(-1/T_1F_s))$ for high value $E_n$, the other represents the same term for low value $E_n$. Logic circuit 704 controls which of the words is passed through gate bank 772 to the C-register 773.

Y-register 774 and adder 775 comprise the means for performing the multiplication $y_n\exp(-1/T_1F_s)$. The term $y_n$ comes from the output of adder 776 fed back to y-register 774. Multiplication is carried out by well known serial shift and add techniques. As is well known, binary shift and add is accomplished by placing the multiplicand in a shift register, connecting selected stages (depending on the multiplier value) of the register to an adder, and shifting the bits in the shift register. Thus, the output value y is entered serially in the y-register 774. The adder inputs are determined by the constant value $\exp(-1/T_1F_s)$. Thus, the output on line 186 is $y_n\exp(-1/T_1F_s)$.

From the equation of $Z_{n+1}$ we note that the y value is multiplied by $G(1-\exp(-1/T_2F_s)$ and added or subtracted from $Z_n\exp(-1/T_2F_s)$. Since the value to be multiplied by $y_{n+1}$ is a constant, the product can be obtained by merely shifting $y_{n+1}$ the desired amount. This could be done in block 778, or in a shifter between blocks 776 and 778, or one could simply pick off a shifted $y_{n+1}$ from the y-register 774 and apply it to block 778.

Block 778 adds the true or complement of $Gy_{n+1}(1-\exp(-1/T_2F_s))$ to the value on line 782. The latter value is $Z_n\exp(-1/T_2F_s)$. The value of the CVSD bit on line 776 determines whether the true or complement of the former value is added. The output from block 778 is therefore the value $Z_{n+1}$ in PCM serial by bit.

Register 780 and adder 781 perform the serial shift and add function to provide the product $Z_n\exp(-1/T_2F_s)$.

The embodiment of FIG. 8 can be altered to be an N-channel CVSD/PCM converter by time sharing all of the computational elements. For example, a register having space for N−1 16-bit words could be inserted in line 783 to hold the $y_{n+1}$ values calculated for the prior N−1 channels. A similar register would be placed at the input to the Z register 780. Instead of having a single 3-bit logic circuit, there would be N such circuits. The same applies to logic circuit 777. The shift rate would also be increased by a factor of N.

The embodiment of FIG. 8 can also be altered by using parallel digital adders instead of serial digital adders. Such a device will not require as large a bit rate as the serial version and is illustrated in FIG. 9. This embodiment is a parallel converter, and, as illustrated, operates in a TDM mode on N-channels of CVSD. Certain parameters are assumed for the specific example described. The input lines are assumed to carry 64 channels, which are employed as 32 full duplex channels. Adjacent even/odd channels form the input/output signals for full duplex connections. The bit rate per channel is 32 kbps. Inputs A and B correspond to inputs from lines 126 and 128 in FIG. 1. Each carries 32 CVSD/TDM channels. Multiplexer 901 combines the inputs into a 64 channel CVSD/TDM output on line 922.

The parallel CVSD/PCM is simple in construction because certain values are assigned to expressions in equations (1) and (2) above, and those values are all integral powers of 2. Thus, one sets the expression $1-\exp(-1/T_iF_s)=2^{-n}$. For $F_s=32{,}000$ bits per second, values of $n=5$ and 7, respectively, yield values of $T_i=0.98$ milliseconds and 3.98 milliseconds. These time constants are sufficiently close to the time constants 1.0 and 4.0 used in the prior integrators so as to cause only a negligible operational difference. Thus, we can substitute $2^{-5}$ and $2^{-7}$ for the expression $1-\exp(-1/T_iF_s)$ in equations (1) and (2) above. Multiplication can be achieved by bit shifting the binary bits either 5 or 7 spaces to the right.

An analysis of equations (1) and (2) reveals that as long as $GE_{max}$ is constant, the distribution of values between G and $E_{max}$ is immaterial. In the prior cases, $GE_{max}$ is about 15. By setting $E_{max}=2^{-1}$ volts and $G=2^5$, then $GE_{max}=16$ volts.

Using the above values, equations (1) and (2) become:

$$y_{n+1}=y_n(2^0-2^{-7})+E_n2^{-7}, \text{ and} \quad (3)$$
$$Z_{n-1}=Z_n(2^0-2^{-5})\pm y_{n+1} \quad (4)$$

The high voltage $E_n$ is selected as $2^{-1}$ and the low voltage $E_n$ is selected as $2^{-6}$. This yields an $E_{max}/E_{min}$ of 32, which is within the range of commonly used values. (It will be noted that these binary values may be used also in connection with FIG. 8.)

Referring to FIG. 9, the output of multiplexer 901 is applied to an serial shift register 902, having 128 stages. The three consecutive bits in the same channel are applied simultaneously to 3-bit logic circuit 903 by connecting the multiplexer output and stages 64 and 128 to logic 903. The logic circuit provides a 1 or 0 bit in accordance with the prior explanation. Either the high $E_n$, which is $2^{-1}$ or the low $E_n$, which is $2^{-6}$, is selected depending upon whether the logic output is 1 or 0. $E_n$ is multiplied by $[1-\exp(-1/T_1F_s)]$, which is $2^{-7}$ in the example. Thus, the 3-bit logic causes an active output on line 925 or 926 via inverter 904. Line 925 is hardwired into adder 905 to cause the binary value $2^{-8}$ to be added therein when line 925 carries a binary 1. Line 926 is hardwired into adder 905 to cause the binary value $2^{-13}$ to be added therein when line 926 carries a binary 1.

The other binary input to the adder is $Y_n(-1-\exp(-1/T_1F_s)$, or, in our example $y_n(2^0-2^{-7})$ appearing on line 929. Thus, the output from adder 905 is $y_{n+1}$.

The FIFO register 906 is a first-in first-out register having a word capacity equal to the number of CVSD/TDM channels, i.e., 64. Thus, for any given channel, $y_n$ appears at the output of FIFO 906 during the same clock period that $y_{n+1}$ appears on the input to FIFO 906.

The $y_n$ output from FIFO 906 is applied directly as one input to subtractor 907, i.e., corresponds to $y_n(2^0)$. The other input to subtractor 907 is $y_n(2^{-7})$ which is obtained by shifting the $y_n$ output 7-bit positions in the direction of the low order bits in binary shifter 900. The two inputs are subtracted resulting in the number $y_n(2^0-2^{-7})$, which is the desired feedback voltage on line 929, By using TWO's complement arithmetic block 707 is actually an adder.

Depending on the value of the bit on line 922, inverter 908 will provide plus or minus $y_{n-1}$ at its output terminal. The latter output is hardwired into adder 909. The other input is $Z_n(2^0-2^{-5})$ from adder 913. The output from adder 909 is the desired value $Z_{n+1}$, which is a PCM value corresponding to the input CVSD channel.

FIFO registers 910 and 911 combined provide a 64 word first-in first-out storage 50 that during the clock period that $Z_{n+1}$ appears at the input to FIFO 910, Z for the same channel appears at the output of FIFO 911. The split FIFO arrangement is not necessary but may be used to provide a delayed $Z_{n+1}$ output on line 938. The $Z_n$ output is hardwired into adder 913 via leads 934 as $+Z_n(2^0)$. Also, $Z_n$ is inverted by inverter 912 and hardwired into adder 913 via lead 935 as $-Z_n(2^{-5})$. The output of adder 913 is thus the desired feedback value $Z_n(2^0-2^{-5})$.

The output of line 939 is thus in the PCM/TDM format and represents the information which was applied at the input in the CVSD/TDM format.

LARGE SWITCH MATRICES

The matrix configuration can be varied to meet the specific switch needs. The matrix illustrated in FIG. 2 is particularly adapted for small switches, e.g., those which do not require over 192 channels per bus (or highway) and do not need more than one highway. The first-half/last-half read-in/read-out mode selected for the small matrix RAM is suitble for the stated requirements, but it limits the number of channels per bus for a given RAM type due to timing limits, and it introduces timing complexities. For example, a 256W×1b RAM might be used because it is the available part with a 192 word capability, but then only a part (192/256) of the total RAM capability is being used.

FIG. 12 gives an example of how a set of four matrices can be configured to provide a 1024 channel capability with up to 64×4=256 ports. FIG. 30 represents one of the four matrices and four such matrices may be located either within one large switch package or within four separate small switches which are "stacked", i.e., interconnected to operate as a single switch.

The 64 port multiplexer (3001), its control RAM (3015), and the associated demultiplexer (3013) operate as previously described for the small matrix except that the ports have been increased from 32 to 64. An option in connecting the ports, if a total of only 64 ports is required, is to parallel connect the 64 ports of all four matrices. This option would enable arbitrary assignment of the 64 ports to each matrix to suit convenience. For example, in the event of a failure in one matrix the signals of the failed matrix could be routed through another matrix. A "spare" matrix might be supplied for this fault by-passing capability. The number of ports can be increased to meet the needs by simply increasing the number of multiplexer elements (3001) and adding a bit to the control RAM (3015) for each doubling of the number of ports, e.g., 128 ports requires a 256W×7b RAM (3015).

The multiplexer output (3002) is a 256 channel highway which drives the two RAM elements (3007 and 3008) and which is fed as an output (3005) to the other three matrices. Likewise, the three leads (3004) are 256 channel highways from the other three switches. The combined effect is 4 highways of 256 channels for a total of 1024 channels. Each matrix supplies a single group of 256 channels as an output (3012) and these channels may be formed by any desired selection of channels from the four highways (3006) going to the two RAMs (3007 and 3008). Additional highways between more than 4 matrices can be supplied by increasing the bits in the two Rams. Thus, a 6 highway system would require 256W−6b RAMs.

The read/write (R/W) control leads (3016 and 3023) are interconnected by an inverter (3018) so that when one RAM (say 3007) is writing, then the other RAM is reading. The 16 KHz square wave (3016) holds each RAM in a selected read or write state for a 32 kbps period and then reverses or interchanges the two states during the next 32 kbps period. This approach simplifies RAM timing since a given RAM is either writing or reading (rather than rapidly alternating between the two states as described for the small matrix).

The switch (3011) provides for selection of which highway is supplying a given output (3012) channel. The control RAM (3030) is 256W×10b (as compared to 256W×8b for the small matrix) and the extra set of 256 2-bit words provides for channel-by-channel selection of the highways.

Switch A (3017) supplies the 8-bit address to RAM A as coming either from the counter (3026) or the RAM (3030). Switch B (3021) operates in the same manner but the switch controls (3016 and 3023) are inverted so that while switch A selects the counter ouptut, switch B selects the RAM output and vice versa.

The remaining circuits are quite similar to those for the small matrix and operate in a similar manner.

What is claimed is:

1. A digital converter for converting information arranged in continuously variable slope delta (CVSD) format into a pulse code modulated (PCM) format, comprising:
   a. a first digital adder for adding first and second inputs and for providing the sum thereof as an output,
   b. means responsive to a predetermined number of consecutive CVSD bits representing said information for applying a first relatively low binary value as a first input to said first digital adder when said consecutive bits are not identical, and for applying a second relatively high binary value as a first input to said first digital adder when said consecutive bits have identical values,
   c. first subtractor means responsive to the output of said first adder means for subtracting a binary shifted version of said output from said output, unshifted, to provide a difference value, said difference value being connected as the second input to said first adder,
   d. a second digital adder for adding first and second inputs thereto and for providing a sum thereof as an output,
   e. true/complement means responsive to the output from said first adder and the last of said consecutive CVSD bits for applying said output in true form to the first input of said second adder when said last CVSD bit is a first value, and for applying the complement of said output to the first input of said second adder when said last CVSD bit is a second value, opposite said first value,
   f. second subtractor means responsive to the output of said second digital adder means for subtracting a binary shifted version of the output of said second adder from an unshifted version of the output of said second adder to provide a difference value, said difference value being connected as the second input to said second adder,
   g. wherein the said output from said second digital adder is in PCM format and represents said information.

2. A digital converter as claimed in claim 1 wherein said first and second digital adders are serial adders, and wherein said first and second subtractor means are serial adders which perform subtraction by adding the complement of the number to be subtracted.

3. A digital converter as claimed in claim 1 wherein said first and second digital adders are parallel adders, and wherein said first and second subtractor means are parallel adders which perform subtraction by adding the complement of the number to be subtracted.

4. A digital converter as claimed in claim 1 and adapted to convert multile channels of CVSD information arranged in TDM into a corresponding number of channels of PCM/TDM channels, wherein said means responsive to a predetermined number of consecutive CVSD bits comprises:
   a. a serial shift register for receiving said CVSD/TDM bits to be converted, and
   b. logic means connected to said register so as to receive said predetermined number of consecutive CVSD bits belonging to the same CVSD channel, for providing one logic output when said bits are of identical value and an opposite logic output when said bits do not have identical values.

5. A digital converter as claimed in claim 4 further comprising:
   a. first sequential storage means connected between the output of said first adder and the input to said first subtractor means for receiving said adder outputs as they occur and applying them to said subtractor one TDM frame later, and
   b. second sequential storage means connected between the output of said second adder and the input to said second subtractor means for receiving said second adder outputs as they occur and applying them to said second subtractor one TDM frame later.

6. A digital converter as claimed in claim 1 wherein said relatively high binary value is $2^{-8}$ and said relatively low binary value is $2^{-13}$.

7. A digital converter as claimed in claim 1 wherein said binary shifted version of said first adder output is said output shifted seven binary positions in the direction to reduce the value thereof, and wherein said binary shifted version of said second adder output is said output shifted five binary positions to reduce the value thereof.

8. A telephone switching network comprising:
   a. first multiplexing means adapted to receive a multiplicity of CVSD and CVSD/TDM inputs and provide a CVSD/TDM output; said output representing signals before switching, b. switching means connected to receive said CVSD/TDM signals from said multiplexer means and selectively rearrange the data in the channels of said CVSD/TDM signals, the output therefrom representing said signals after switching.

c. first demultiplexing means for connecting selected ones of the channels in the output of said switching means to selected output ports thereof, d. a CVSD/PCM converter for converting CVSD signals at an input thereof into PCM signals at an output thereof, said input being connected to the input and outut of said switching means whereby selected channels from said unswitched and said switched CVSD/TDM signals are routed to said converter, and e. means for connecting said switching means to an analog loop to enable said switching network to switch analog signals, said means comprising:

i. a differential amplifier having one input connected to receive input analog signals, and a second input, the output therefrom being connected as a CVSD signal to said first multiplexing means, ii. a PCM to analog converter having an input connected to the output of said CVSD/PCM converter and an output connected to said second input of said differential amplifier.

9. A telephone switching network as claimed in claim 8, wherein said CVSD/PCM converter comprises:

a. a first digital adder for adding first and second inputs and for providing the sum thereof as an output, b. means responsive to a predetermined number of consecutive CVSD bits representing said information for applying a first relatively low binary value as a first input to said first digital adder when said consecutive bits are not identical, and for applying a second relatively high binary value as a first input to said first digital adder when said consecutive bits have identical values, c. first subtractor means responsive to the output of said first adder means for subtracting a binary shifted version of said output from said output, unshifted, to provide a difference value, said difference value being connected as the second input to said first adder, d. a second digital adder for adding first and second inputs thereto and for providing a sum thereof as an output, e. true/complement means responsive to the output from said first adder and the last of said consecutive CVSD bits for applying said output in true form to the first input of said second adder when said last CVSD bit is a first value, and for applying the complement of said output to the first input of said second adder when said last CVSD bit is a second value, opposite said first value, f. second subtractor means responsive to the output of said second digital adder means for subtracting a binary shifted version of the output of said second adder from an unshifted version of the output of said second adder to provide a difference value, said difference value being connected as the second input to said second adder, g. wherein the said output from said second digital adder is in PCM format and represents said information.

10. A telephone switching network as claimed in claim 8 further comprising means for connecting said switching means to a PCM/TDM trunk to enable said switching network to switch PCM/TDM signals, said means comprising:

a. digital comparator means having a first input for receiving PCM input signals, a second input connected to the output of said CVSD/PCM converter, for providing a 1 or 0 bit output depending upon which of the PCM signals applied to said two inputs is the greater, said output being connected to first multiplexing means, and b. means for connecting selected outputs from said CVSD/PCM converter to said PCM/TDM trunk.

11. A telephone switching network as claimed in claim 10 wherein said means for connecting said switching means to a PCM/TDM trunk further comprises:

a. read only memory means responsive to compressed PCM signals received via said trunk for converting said compressed PCM signals into linear PCM signals, and b. rate adjustment means responsive to said linear PCM signals for altering the rate of said linear PCM signals to coincide with the rate of signals in said switching means, the output of said rate adjustment means being connected as the first input to said digital comparator.

12. A telephone switching network as claimed in claim 11 wherein said means for connecting selected outputs from said CVSD/PCM converter to said PCM trunk comprises:

a. averaging filter means responsive to said selected PCM signals received at the rate of signals in said switching means for providing said PCM signals at an output thereof at a rate corresponding to the signal rate on said PCM/TDM trunk, and b. linear-to-compressed PCM conversion means connected to said averaging filter means and responsive to the output therefrom for converting the PCM output signals from said filter into compressed PCM signals, said latter compressed PCM signals being connected to said PCM/TDM trunk.

13. A switching network as claimed in claim 8 further comprising means for connecting said switching means to CVSD loop, said last mentioned means comprising input means for connecting input CVSD signals from said CVSD loop to selected input ports of said first multiplexing means, and output means for connecting output CVSD signals from selected output ports of said first demultiplexing means to said CVSD loop.

14. A switching network as claimed in claim 8 further comprising means for connecting said switching means to a CVSD/TDM trunk, said last mentioned means comprising input means for connecting input CVSD signals from said CVSD/TDM trunk to selected input ports of said first multiplexing means, and output means for connecting output CVSD signals from selected output ports of said first demultiplexing means to said CVSD/TDM trunk.

15. A telephone switching network as claimed in claim 14 further comprising means for connecting said switching means to a PCM/TDM trunk to enable said switching network to switch PCM/TDM signals, said means comprising:

a. digital comparator means having a first input for receiving PCM input signals, a second input connected to the output of said CVSD/PCM converter, for providing a 1 or 0 bit output depending upon which of the PCM signals applied to said two inputs is the greater, said output being connected to first multiplexing means, and b. means for connecting selected outputs from said CVSD/PCM converter to said PCM/TDM trunk.

16. A switching network as claimed in claim 15 further comprising means for connecting said switching means to a CVSD loop, said last mentioned means comprising input means for connecting input CVSD signals from said CVSD loop to selected input ports of said first multiplexing means, and output means for connecting output CVSD signals from selected output ports of said first demultiplexing means to said CVSD loop.

17. A switching network as claimed in claim 8 further comprising a conference call means for combining selected input channels appearing at the output of said first multiplexer means to permit said channels to be included in a conference call, said conference call means comprising:

a. means connected to said CVSD/PCM converter for summing the signals in all said selected input channels after conversion into PCM format by said CVSD/PCM converter, said sum being in PCM format, b. means responsive to the PCM signal corresponding to each said selected channel for forming an altered PCM sum signal by subtracting said selected PCM signal from said sum, and c. means for converting said altered PCM sum into CVSD format, the output of said last mentioned means being connected to one of the input ports of said first multiplexer.

18. A switching network as claimed in claim 16 further comprising a conference call means for combining selected input channels appearing at the output of said first multiplexer means to permit said channels to be included in a conference call, said conference call means comprising:

a. means connected to said CVSD/PCM converter for summing the signals in all said selected input channels after conversion into PCM format by said CVSD/PCM converter, said sum being in PCM format, b. means responsive to the PCM signal corresponding to each said selected channel for forming an altered PCM sum signal by subtracting said selected PCM signal from said sum, and c. means for converting said altered PCM sum into CVSD format, the output of said last mentioned means being connected to one of the input ports of said first multiplexer.

19. A telephone switching network comprising:

a. a first multiplexer means, having a plurality of input ports, one output port, and a control input, for connecting signals on said input ports to said output port selectively in dependence upon the port number signal applied to said control input, b. a first read/write memory adapted to store words representing port numbers at respective addresses therein and to read-out a port number from a given address in response to said address signal being applied thereto, the port numbers read from said read/write memory being connected to the control input of said first multiplexer, c. counter means for advancing in count at a first rate and for recycling at a second rate, said first rate being the combined channel rate of said switching network, said second rate being the frame rate and the single channel rate of said switching network, the count in said counter being applied as the address signal to said read/write memory, d. switching means connected to receive the signals at the output port of said first multiplexer for selectively rearranging the order of occurrence of said signals and for providing said rearranged signals at an output thereof, said switching means comprising:

i. a second read/write random access memory responsive to an input signal appearing at an input thereof, a read control input, and an address signal input, for storing said input signal at the address corresponding to said address signal input; said memory being further responsive to a write control input and an address signal input for reading out the signal stored at the address corresponding to said address signal, ii. means for separately applying read and write control signals to said second memory, iii. a third read/write random access memory adapted to store words therein corresponding to addresses of said second memory, and iv. means for applying the count of said counter and the words of said third memory as the address signal input to said second memory.

20. A telephone switching network as claimed in claim 19, further comprising, a first demultiplexer means, having an input port connected to the output of said switching means, a plurality of output ports, and a control input, for connecting signals at said input port to an output port selectively dependence upon the port number signal applied to said control input.

21. A telephone switching network as claimed in claim 20 wherein the port numbers read from said first read/write memory are connected to the control input of said first demultiplexer means.

22. A telephone switching network as claimed in claim 21 wherein signals appearing at the inputs and outputs of said first multiplexer, said first demultiplexer, and said switching means, are in the CVSD/TDM format, said network further comprising:

a. a CVSD/PCM converter for converting CVSD signals appearing at an input thereof into PCM signals at an output thereof, the input of said converter being connected to the input and the output of said switching means whereby selected channel signals prior to and subsequent to rearrangement can be converted to the PCM format, and b. means for connecting said switching means to an analog loop to enable said switching network to switch analog signals, said means comprising:

i. a differential amplifier having one input connected to receive input analog signals, and a second input, the output therefrom being connected as a CVSD signal to said first multiplexing means, ii. a PCM-to-analog converter having an input connected to the output of said CVSD/PCM converter and an output connected to said second input of said differential amplifier.

23. A telephone switching network as claimed in claim 22, wherein said CVSD/PCM converter comprises:

a. a first digital adder for adding first and second inputs and for providing the sum thereof as an output, b. means responsive to a predetermined number of consecutive CVSD bits representing said information for applying a first relatively low binary value as a first input to said first digital adder when said consecutive bits are not identical, and for applying a second relatively high binary value as a first input to said first digital adder when said consecutive bits have the identical values, c. first subtractor means responsive to the output of said first adder means for subtracting a binary shifted version of said output from said output, unshifted, to provide a difference value, said difference value being connected as the second input to said first adder, d. a second digital adder for adding first and second inputs thereto and for providing a sum thereof as an output, e. true/complement means responsive to the output from said first adder and the last of said consecutive CVSD bits for applying said output in true form to the first input of said second adder when said last CVSD bit is a first value, and for applying the complement of said output to the first input of said second adder when said last CVSD bit is a second value, opposite said first value, f. second subtractor means responsive to the output of said second digital adder means for subtracting a binary shifted version of the output of said second adder from an unshifted version of the output of said second adder to provide a difference value, said difference value being connected as the second input to said second adder, g. wherein the said output from said second digital adder is in PCM format and represents said information.

24. A telephone switching network as claimed in claim 22 further comprising means for connecting said switching means to a PCM/TDM trunk to enable said switching network to switch PCM/TDM signals, said means comprising:

a. digital comparator means having a first input for receiving PCM input signals, a second input connected to the output of said CVSD/PCM converter for providing a 1 to 0 bit output depending upon which of the PCM signals applied to said two inputs is the greater, said output being connected to said first multiplexing means, and b. means for connecting selected outputs from said CVSD/PCM converter to said PCM/TDM trunk.

25. A telephone switching network as claimed in claim 24 wherein said means for connecting said switching means to a PCM/TDM trunk further comprises:

a. read only memory means responsive to compressed PCM signals received via said trunk for converting said compressed PCM signals into linear PCM signals, and b. rate adjustment means responsive to said linear PCM signals for altering the rate of said linear PCM signals to coincide with the rate of signals in said switching means, the output of said rate adjustment means being connected as the first input to said digital comparator.

26. A telephone switching network as claimed in claim 25 wherein said means for connecting selected outputs from said CVSD/PCM converter to said PCM trunk comprises:

a. averaging filter means responsive to said selected PCM signals received at the rate of signals in said switching means for providing said PCM signals at an output thereof at a rate corresponding to the signal rate on said PCM/TDM trunk, and b. linear to compressed PCM conversion means connected to said averaging filter means and responsive to the output therefrom for converting the PCM output signals from said filter into compressed PCM signals, said latter compressed PCM signals being connected to said PCM/TDM trunk.

27. A switching network as claimed in claim 22 further comprising means for connecting said switching means to a CVSD loop, said last mentioned means comprising input means for connecting input CVSD signals from said CVSD loop to selected input ports of said first multiplexing means, and output means for connecting output CVSD signals from selected output ports of said first demultiplexing means to said CVSD loop.

28. A switching network as claimed in claim 22 further comprising means for connecting said switching means to a CVSD/TDM trunk, said last mentioned means comprising input means for connecting input CVSD signals from said CVSD/TDM trunk to selected input ports of said first multiplexing means, and output means for connecting output CVSD signals from selected output ports of said first demultiplexing means to said CVSD/TDM trunk.

29. A telephone switching network as claimed in claim 28 further comprising means for connecting said switching means to a PCM/TDM trunk to enable said switching network to switch PCM/TDM signals, said means comprising:

a. digital comparator means having a first input for receiving PCM input signals, a second input connected to the output of said CVSD/PCM converter, for providing a 1 to 0 bit output depending upon which of the PCM signals applied to said two inputs is the greater, said output being connected to first multiplexing means, and b. means for connecting selected outputs from said CVSD/PCM converter to said PCM/TDM trunk.

30. A switching network as claimed in claim 29 further comprising means for connecting said switching means to a CVSD loop, said last mentioned means comprising input means for connecting input CVSD signals from said CVSD loop to selected input ports of said first multiplexing means, and output means for connecting output CVSD signals from selected output ports of said first demultiplexing means to said CVSD loop.

31. A switching network as claimed in claim 22 further comprising a conference call means for combining selected input channels appearing at the output of said first multiplexer means to permit said channels to be included in a conference call, said conference call means comprising:

a. means connected to said CVSD/PCM converter for summing the signals in all said selected input channels after conversion into PCM format by said CVSD/PCM converter, said sum being in PCM format, b. means responsive to the PCM signal corresponding to each said selected channel for forming an altered PCM sum signal by subtracting said selected PCM signal from said sum, and c. means for converting said altered PCM sum into CVSD format, the output of said last mentioned means being connected to one of the input ports of said first multiplexer.

32. A switching network as claimed in claim 30 further comprising a conference call means for combining selected input channels appearing at the output of said first multiplexer means to permit said channels to be included in a conference call, said conference call means comprising:

a. means connected to said CVSD/PCM converter by summing the signals in all said selected input channels after conversion into PCM format by said CVSD/PCM converter, said sum being in PCM format, b. means responsive to the PCM signal corresponding to each said selected channel for forming an altered PCM sum signal by subtracting said selected PCM signal from said sum, and c. means for converting said altered PCM sum into CVSD format, the output of said last mentioned means being connected to one of the input ports of said first multiplexer.

*33. A CVSD/PCM converter as defined in claim 1 further comprising means for accomplishing a conversion from analog to CVSD signals, said means comprising:*

*a. a difference amplifier means having one input connected to receive input analog signals, and having a second input, the output from said difference amplifier being connected as a CVSD signal to said CVSD/PCM converter, and*

*b. PCM to analog converter means having an input connected to the output of said CVSD/PCM converter, and an output connected to said second input of said difference amplifier.*

*34. A CVSD/PCM converter as defined in claim 1 further comprising means for accomplishing a conversion from CVSD to analog signals, said means comprising,*

*a. means for applying a CVSD signal as an input to said CVSD/PCM converter,*

*b. said CVSD/PCM converter having an output,*

*c. a PCM to analog converter having an input connected to receive the output from said CVSD/PCM converter,*

*d. said PCM to analog converter having an output, and*

*e. a band-pass filter having an input arranged to receive the output from said PCM to analog converter, and providing at its output, a reconstituted analog signal.*

*35. A telephone switching network providing time division switching between multiple time division multiplexed signals comprising:*

*a. multiplexing means having a multiplicity of input ports, and adapted to receive a mutliplicty of CVSD/TDM inputs, with different numbers of TDM channels at each input port, and provide a CVSD/TDM output as determined by a first memory means, said output representing signals before switching,*

*b. switching means connected to receive said CVSD/TDM signals from said multiplexing means and selectively rearrange the data in the channels of said CVSD/TDM signals under control of a second memory means, the output therefrom representing said signals after switching, and*

*c. demultiplexing means for connecting selected ones of the channels in the output of said switching means to selected output ports thereof under control of said first memory means, and providing either half duplex or full duplex interconnections between inputs of said multiplexing means, and outputs of said demultiplexing means.*

*36. A telephone switching network as defined in claim 35 wherein said first and second memory means are under the control of an external processor.*

* * * * *